US012811711B2

(12) United States Patent
Doerr

(10) Patent No.: US 12,811,711 B2
(45) Date of Patent: Nov. 24, 2026

(54) ELECTRICAL DEMULTIPLEXING FOR HOMODYNE DUAL-POLARIZATION (DP) OPTICAL COMMUNICATION SYSTEMS

(71) Applicant: Aloe Semiconductor Inc., Middletown, NJ (US)

(72) Inventor: Christopher R. Doerr, Middletown, NJ (US)

(73) Assignee: Aloe Semiconductor Inc., Middletown, NJ (US)

( * ) Notice: Subject to any disclaimer, the term of this patent is extended or adjusted under 35 U.S.C. 154(b) by 231 days.

(21) Appl. No.: 18/891,209

(22) Filed: Sep. 20, 2024

(65) Prior Publication Data

US 2025/0247164 A1 Jul. 31, 2025

Related U.S. Application Data

(60) Provisional application No. 63/626,445, filed on Jan. 29, 2024.

(51) Int. Cl.
*H04J 14/06* (2006.01)
*H04B 10/50* (2013.01)
(Continued)

(52) U.S. Cl.
CPC ............ *H04J 14/06* (2013.01); *H04B 10/505* (2013.01); *H04B 10/54* (2013.01); *H04B 10/614* (2013.01);
(Continued)

(58) Field of Classification Search
CPC .... H04B 10/505; H04B 10/54; H04B 10/614; H04B 10/6166; H04J 14/06; H04J 1/02;
(Continued)

(56) References Cited

U.S. PATENT DOCUMENTS 9,692,521 B1 6/2017 Zhou et al.
10,177,872 B1 1/2019 Wang et al.
(Continued)

FOREIGN PATENT DOCUMENTS

KR 20110131747 A * 12/2011 ............. H04B 10/63

OTHER PUBLICATIONS

Ioannis Roudas et al. , "Optimal Polarization Demultiplexing for Coherent Optical Communications Systems," Mar. 12, 2010, Journal of Lightwave Technology, vol. 28, No. 7, Apr. 1, 2010,pp. 1121-1132.*

(Continued)

*Primary Examiner* — Omar S Ismail
(74) *Attorney, Agent, or Firm* — Fish & Richardson P.C.

(57) ABSTRACT

A dual-polarization (DP) intensity-modulated direct detection (IMDD) receiver includes: an input port configured to receive input light; an optical 2×2 multi-input-multi-output (MIMO) demultiplexer configured to receive light from a first optical transmission path and a second optical transmission path and perform optical 2×2 MIMO polarization demultiplexing; a pair of photodetectors configured to detect outputs at a common carrier frequency; and an electrical 2×2 MIMO demultiplexer configured to receive a signal from the first electrical transmission path and a signal from the second electrical transmission path and perform electrical 2×2 MIMO polarization demultiplexing to output a first demultiplexed signal and a second demultiplexed signal.

20 Claims, 9 Drawing Sheets

Optical MIMO Demultiplexer

(51) Int. Cl.
*H04B 10/54* (2013.01)
*H04B 10/61* (2013.01)
*H04J 14/02* (2006.01)

(52) U.S. Cl.
CPC ...... *H04B 10/6166* (2013.01); *H04J 14/0307* (2023.08)

(58) Field of Classification Search
CPC ........ H04J 3/02; H04J 3/16; H04J 3/17; H04J 3/24; H04J 2011/0003; H04J 11/0023; H04J 11/0069; H04J 13/0007; H04J 13/0077; H04J 13/10; H04J 13/16; H04J 14/005; H04J 14/02; H04J 14/0201; H04J 14/0221; H04J 14/0227; H04J 14/0278; H04J 14/0287; H04J 14/03; H04J 14/05; H04J 14/08; H04J 2203/0001; H04J 2203/0003; H04J 2203/0057; H04J 2203/0051; H04J 2203/0046; H04J 2203/0028; H04J 2203/0064; H04J 2203/0073; H04J 2203/0089; H04J 2211/003
See application file for complete search history.

(56) References Cited

U.S. PATENT DOCUMENTS 11,588,549 B1 2/2023 Zarkovsky et al.
2003/0043440 A1 3/2003 Suzaki et al.
2008/0159741 A1 7/2008 Secondini et al.
2009/0202243 A1 8/2009 Qian et al.
2010/0296819 A1* 11/2010 Kahn ..................... H04B 10/60 398/208
2011/0310951 A1 12/2011 Cvijetic et al.
2012/0002211 A1* 1/2012 Cho .......................... G01J 3/45 356/451
2012/0134676 A1 5/2012 Kikuchi
2012/0219285 A1* 8/2012 Dahan .............. H04B 10/07953 398/26
2012/0251110 A1 10/2012 Cvijetic et al.
2013/0044974 A1 2/2013 Doerr
2013/0045006 A1* 2/2013 Dahan ................. H04J 14/0257 398/34
2013/0195455 A1 8/2013 Jansen et al.
2014/0369685 A1 12/2014 Calabro et al.
2016/0076941 A1* 3/2016 Chitgarha .............. H04B 10/00 250/216
2016/0248515 A1* 8/2016 Zheng .............. H04B 10/25752
2019/0089479 A1 3/2019 Yamauchi et al.
2019/0379462 A1* 12/2019 Razzell ................... H04J 14/06
2020/0044747 A1* 2/2020 Zhang .................. H04B 10/272
2020/0083995 A1 3/2020 Suzuki et al.
2020/0213105 A1* 7/2020 Li ........................ H04B 10/516
2021/0044361 A1 2/2021 Suhr et al.
2021/0231467 A1* 7/2021 Awwad ................ H04B 10/071
2022/0094439 A1* 3/2022 Schmidt-Langhorst ..................... H04B 10/614
2022/0236083 A1* 7/2022 Ip ........................ G01D 5/35361
2022/0360337 A1* 11/2022 Sadot ................... H04B 10/506
2023/0254048 A1* 8/2023 Gupta ................ H04B 10/2581 398/164
2025/0062832 A1* 2/2025 Doerr ................... H04B 10/532

OTHER PUBLICATIONS

Eslam El-Fiky et al.,"200 GB/s transmission using a dual-polarization O-Band silicon photonic intensity modulator for Stokes vector direct detection applications," Nov. 17, 2017, Optics Express, vol. 25, No. 24, Nov. 27, 2017,pp. 30336-30347.*
Go Soma et al.,"Integrated dual-polarization coherent receiver without a polarization splitter-rotator," Jan. 11, 2021, Optics Express,vol. 29, No. 2,Jan. 18, 2021,pp. 1711-1720.*
Di Che et al.,"Direct detection of the optical field beyond single polarization mode," Jan. 31, 2018, Optics Express,vol. 26, No. 3,Feb. 5, 2018, pp. 3368-3379.*
Mathieu Chagnon et al.,"Multi-Dimensional Formats and Trans-ceiver Architectures for Direct Detection With Analysis on Inter-Polarization Phase Modulation," Aug. 23, 2016, Journal of Light-wave Technology, vol. 35, No. 4, Feb. 15, 2017,pp. 885-891.*
Rafael Puerta et al.,"Single-Carrier Dual-Polarization 328-GB/s Wireless Transmission in a D-Band Millimeter Wave 2×2 MU-MIMO Radio-Over-Fiber System," Feb. 24, 2018,Journal of Light-wave Technology, vol. 36, No. 2, Jan. 15, 2018,pp. 587-591.*
Mohamed Morsy-Osman et al.,"224-GB/s 10-km Transmission of PDM PAM-4 at 1.3 μm Using a Single Intensity-Modulated Laser and a Direct-Detection MIMO DSP-Based Receiver," Jan. 11, 2015,Journal of Lightwave Technology, vol. 33, No. 7, Apr. 1, 2015,pp. 1417-1423.*
Xue Li et al.,"Polarization demultiplexing scheme for probabilistic shaping Stokes vector direct detection systemusing extended Kal-man filter," Dec. 27, 2019, Optics Communications 461 (2020) 125192,pp. 1-8.*
Yi Weng et al.,"Recent Advances in DSP Techniques for Mode Division Multiplexing Optical Networks with MIMO Equalization: A Review," Mar. 20, 2019, Appl. Sci. 2019, 9, 1178,pp. 1-22.*

* cited by examiner

ELECTRICAL DEMULTIPLEXING FOR HOMODYNE DUAL-POLARIZATION (DP) OPTICAL COMMUNICATION SYSTEMS

CROSS-REFERENCE TO RELATED APPLICATIONS

This application claims the benefit of priority to U.S. Provisional Patent Application No. 63/626,445, filed on Jan. 29, 2024, the entire contents of which are incorporated by reference herein.

TECHNICAL FIELD

The present disclosure generally relates to demultiplexers for dual-polarization (DP) optical communication systems.

BACKGROUND

In optical communication systems, multiplexing techniques (such as polarization-division multiplexing (PDM)) can increase communication capacity and/or photon efficiency by multiplexing different signals over different channels (e.g., different polarization modes) for simultaneous transmission through a single fiber. However, a challenge of using PDM is that the polarization modes tend to undergo random and unpredictable rotations and losses as they propagate through an optical communication system, for example due to stress in the glass fiber (bending and twisting), ambient temperature changes, or other non-idealities in the communication system. As a result, the signals in the different polarization modes become mixed among each other when they are received, resulting in crosstalk between signals on the different channels. In such scenarios, the signals must be unmixed at the receiver through multiple-input-multiple-output (MIMO) demultiplexing.

SUMMARY

Some aspects of this disclosure relate to a dual-polarization (DP) intensity-modulated direct detection (IMDD) system. The system includes a transmitter including: a laser configured to emit light, a first splitter configured to split the light from the laser into a first input light and a second input light, a first modulator configured to modulate the first input light with a first data stream and a second modulator configured to modulate the second input light with a second data stream, and at least one first optical element configured to cause the modulated first input light and modulated second input light to have different polarizations and provide the modulated first input light and modulated second input light into a transmission link. The system includes a receiver including: an input port configured to receive light from the transmission link, at least one second optical element configured to split the light from the transmission link into a first split light provided into a first optical transmission path and a second split light provided into a second optical transmission path, an optical 2×2 multi-input-multi-output (MIMO) demultiplexer configured to receive light from the first optical transmission path and the second optical transmission path, a pair of photodetectors including (i) a first photodetector configured to detect a first demultiplexed output from the optical 2×2 MIMO demultiplexer and output a first electrical signal into a first electrical transmission path, and (ii) a second photodetector configured to detect a second demultiplexed output from the optical 2×2 MIMO demultiplexer and output a second electrical signal into a second electrical transmission path. The system includes an electrical 2×2 MIMO demultiplexer configured to receive a signal from the first electrical transmission path and a signal from the second electrical transmission path and output a first demultiplexed signal and a second demultiplexed signal.

This and other systems (e.g., DP-IMDD systems) described herein can have one or more of at least the following characteristics.

In some implementations, the electrical 2×2 MIMO demultiplexer has a butterfly structure including at least one adjustable element on a cross-arm of the butterfly structure.

In some implementations, the electrical 2×2 MIMO demultiplexer includes: a first splitter configured to split the signal from the first electrical transmission path into a third electrical transmission path and a fourth electrical transmission path; a second splitter configured to split the signal from the second electrical transmission path into a fifth electrical transmission path and a sixth electrical transmission path; a first gain element configured to apply a controllable gain on the third electrical transmission path; a second gain element configured to apply a controllable gain on the fifth electrical transmission path; a first summing element configured to sum an output of the first gain element and an output from the sixth electrical transmission path; and a second summing element configured to sum an output of the second gain element and an output from the fourth electrical transmission path.

In some implementations, the system includes at least one of: a third gain element configured to apply a gain on the fourth electrical transmission path and output to the second summing element; or a fourth gain element configured to apply a gain on the sixth electrical transmission path and output to the first summing element.

In some implementations, the system includes a controller configured to control the at least one adjustable element to apply a gain of the same sign as a gain applied on a bar-arm of the butterfly structure.

In some implementations, the system includes a controller configured to control the at least one adjustable elements to apply a gain having a magnitude that is substantially equal to $$\frac{-\varepsilon_{12}^2 - \varepsilon_{12}\cos\varphi_{12}\sqrt{\frac{c_1}{c_2}}}{1 + \varepsilon_{12}\cos\varphi_{12}\sqrt{\frac{c_2}{c_1}}}$$

where $\varepsilon_{12}$ is a degree of cross-talk between the first demultiplexed signal and the second demultiplexed signal, $c_1$ and $c_2$ are direct current (DC) values of powers associated with the first demultiplexed signal and the second demultiplexed signal, respectively, and $\varphi_{12}$ is a phase between the first demultiplexed signal and a cross-talk signal component.

In some implementations, the electrical 2×2 MIMO demultiplexer is a linear electrical network.

In some implementations, the electrical 2×2 MIMO demultiplexer includes an analog electronic circuit.

In some implementations, the system includes a transimpedance amplifier including the electrical 2×2 MIMO demultiplexer.

In some implementations, the electrical 2×2 MIMO demultiplexer includes a digital electronic circuit.

In some implementations, the system includes a digital signal processor (DSP) including the electrical 2×2 MIMO demultiplexer.

In some implementations, the system includes: a first analog-to-digital converter (ADC) configured in the first electrical transmission path between the first photodetector and the electrical 2×2 MIMO demultiplexer; and a second ADC configured in the second electrical transmission path between the second photodetector and the electrical 2×2 MIMO demultiplexer.

In some implementations, the system includes: a first transimpedance amplifier (TIA) configured in the first electrical transmission path between the first photodetector and the electrical 2×2 MIMO demultiplexer; and a second TIA configured in the second electrical transmission path between the second photodetector and the electrical 2×2 MIMO demultiplexer.

In some implementations, a pair of optical signals that are output from the optical 2×2 MIMO demultiplexer includes the first demultiplexed output from the optical 2×2 MIMO demultiplexer and the second demultiplexed output from the optical 2×2 MIMO demultiplexer that are received by the first photodetector and the second photodetector, respectively.

In some implementations, the optical 2×2 MIMO demultiplexer provides partial or full demultiplexing for one or both of the pair of optical signals that are output from the optical 2×2 MIMO demultiplexer.

In some implementations, the optical 2×2 MIMO demultiplexer includes: a first optical phase shifter configured to receive the first split light and the second split light from the at least one optical element and apply a first relative phase shift between the first split light and the second split light; a first 2×2 optical coupler configured to combine the first split light and the second split light and output third light and fourth light; a second optical phase shifter configured to apply a second relative phase shift between the third light and the fourth light; and a second 2×2 optical coupler configured to combine the third light and the fourth light and output fifth light and sixth light.

In some implementations, the electrical 2×2 MIMO demultiplexer is configured to combine (i) a controllable frequency-dependent derivative of the signal from the first electrical transmission path with (ii) the signal from the second electrical transmission path or a derivative thereof.

Some aspects of this disclosure relate to a method of performing dual-polarization (DP) intensity-modulated direct detection (IMDD) transmission. The method includes: generating light using a laser; splitting the light from the laser into first input light and second input light; modulating the first input light with a first data stream and modulating the second input light with a second data stream; causing the modulated first input light and the modulated second input light to have different polarizations and providing the modulated first input light and the modulated second input light into a transmission link; receiving light from the transmission link; splitting the light from the transmission link into first split light provided into a first optical transmission path and second split light provided into a second optical transmission path; performing optical 2×2 multi-input-multi-output (MIMO) polarization demultiplexing on light from the first optical transmission path and the second optical transmission path; detecting a first output from the optical 2×2 MIMO polarization demultiplexing with a first photodetector and outputting an electrical signal into a first electrical transmission path, and detecting a second output from the optical 2×2 MIMO polarization demultiplexing with a second photodetector and outputting an electrical signal into a second electrical transmission path; and performing electrical 2×2 MIMO polarization demultiplexing on a signal from the first electrical transmission path and a signal from the second electrical transmission path, to output a first demultiplexed signal and a second demultiplexed signal.

This and other methods described herein can have one or more of at least the following characteristics.

In some implementations, performing the electrical 2×2 MIMO polarization demultiplexing includes applying at least one controllable gain on the signals from the first electrical transmission path and the second electrical transmission path using a butterfly network.

In some implementations, applying the at least one controllable gain includes applying a first gain in a bar-path of the butterfly network and a second gain in a cross-path of the butterfly network, the first gain and the second gain having the same sign.

Some aspects of this disclosure relate to a dual-polarization (DP) intensity-modulated direct detection (IMDD) receiver. The receiver includes: an input port configured to receive input light; at least one optical element configured to split the input light into first split light provided into a first optical transmission path and second split light provided into a second optical transmission path, where the first split light and the second split light have a common carrier frequency and different polarizations; an optical 2×2 multi-input-multi-output (MIMO) demultiplexer configured to receive light from the first optical transmission path and the second optical transmission path and perform optical 2×2 MIMO polarization demultiplexing; a pair of photodetectors including (i) a first photodetector configured to detect a first output from the optical 2×2 MIMO demultiplexer at the common carrier frequency and output a first electrical signal into a first electrical transmission path, and (ii) a second photodetector configured to detect a second output from the optical 2×2 MIMO demultiplexer at the common carrier frequency and output a second electrical signal into a second electrical transmission path; and an electrical 2×2 MIMO demultiplexer configured to receive a signal from the first electrical transmission path and a signal from the second electrical transmission path and perform electrical 2×2 MIMO polarization demultiplexing to output a first demultiplexed signal and a second demultiplexed signal.

Some aspects of this disclosure relate to a dual-polarization (DP) intensity-modulated direct detection (IMDD) receiver. The receiver includes: an input port configured to receive input light; at least one optical element configured to split the input light into first split light provided into a first optical transmission path and second split light provided into a second optical transmission path; an optical 2×2 multi-input-multi-output (MIMO) demultiplexer configured to receive light from the first optical transmission path and the second optical transmission path; a pair of photodetectors including (i) a first photodetector configured to detect a first demultiplexed output from the optical 2×2 MIMO demultiplexer and output a first electrical signal into a first electrical transmission path, and (ii) a second photodetector configured to detect a second demultiplexed output from the optical 2×2 MIMO demultiplexer and output a second electrical signal into a second electrical transmission path; and an electrical 2×2 MIMO demultiplexer configured to receive a signal from the first electrical transmission path and a signal from the second electrical transmission path and output a first demultiplexed signal and a second demultiplexed signal. The electrical 2×2 MIMO demultiplexer includes an adjustable gain element on a cross-path of the electrical 2×2 MIMO demultiplexer, the adjustable gain element configured to apply a first gain having the same sign as a second gain applied on a bar-path of the electrical 2×2 MIMO demultiplexer.

This and other receivers described herein can have one or more of at least the following characteristics.

In some implementations, the adjustable gain element is configured to apply the first gain on the signal from the first electrical transmission path or a derivative thereof, and the electrical 2×2 MIMO demultiplexer includes: a circuit element configured to combine (i) an output of the adjustable gain element or a derivative thereof, with (ii) the signal from the second electrical transmission path or a derivative thereof.

In some implementations, the circuit element includes a summer.

In some implementations, the cross-path and the bar-path have inputs from a common splitter.

In some implementations, the cross-path and the bar-path have outputs to a common circuit element configured to combine signals from the cross-path and the bar-path.

In some implementations, the adjustable gain element is a first adjustable gain element, and the electrical 2×2 MIMO demultiplexer includes: a first splitter configured to split the signal from the first electrical transmission path into a third electrical transmission path and a fourth electrical transmission path, where the first adjustable gain element is configured to apply the first gain on the third electrical transmission path; a second splitter configured to split the signal from the second electrical transmission path into a fifth electrical transmission path and a sixth electrical transmission path; a second adjustable gain element configured to apply a controllable gain on the fifth electrical transmission path; a first summing element configured to sum an output of the first adjustable gain element and an output from the sixth electrical transmission path; and a second summing element configured to sum an output of the second adjustable gain element and an output from the fourth electrical transmission path.

In some implementations, the receiver includes at least one of: a third gain element configured to apply a gain on the sixth electrical transmission path and output to the first summing element; or a fourth gain element configured to apply a gain on the fourth electrical transmission path and output to the second summing element.

In some implementations, the receiver includes a controller configured to control the adjustable gain element to apply the first gain.

In some implementations, the receiver includes a controller configured to control the adjustable gain element to apply the first gain with a magnitude that is substantially equal to $$\frac{-\varepsilon_{12}^2 - \varepsilon_{12}\cos\varphi_{12}\sqrt{\frac{c_1}{c_2}}}{1 + \varepsilon_{12}\cos\varphi_{12}\sqrt{\frac{c_2}{c_1}}}$$

where $\varepsilon_{12}$ is a degree of cross-talk between the first demultiplexed signal and the second demultiplexed signal, $c_1$ and $c_2$ are direct current (DC) values of powers associated with the first demultiplexed signal and the second demultiplexed signal, respectively, and $\varphi_{12}$ is a phase between the first demultiplexed signal and a cross-talk signal component.

In some implementations, the adjustable gain element is frequency-dependent.

In some implementations, the adjustable gain element includes a feed-forward equalizer.

Some aspects of this disclosure relate to a dual-polarization (DP) intensity-modulated direct detection (IMDD) receiver. The receiver includes an electrical 2×2 MIMO demultiplexer configured to: receive a first signal and a second signal, and output a first demultiplexed signal and a second demultiplexed signal based on the first signal and the second signal. The electrical 2×2 MIMO demultiplexer includes an adjustable gain element on a cross-path of the electrical 2×2 MIMO demultiplexer, the adjustable gain element configured to apply a first gain having the same sign as a second gain applied on a bar-path of the electrical 2×2 MIMO demultiplexer.

Some aspects of this disclosure relate to a dual-polarization (DP) intensity-modulated direct detection (IMDD) receiver. The receiver includes: an electrical 2×2 MIMO demultiplexer configured to: receive a first signal and a second signal, combine (i) a frequency-dependent derivative of the first signal with (ii) the second signal or a derivative thereof, and output a first demultiplexed signal and a second demultiplexed signal based on combining the frequency-dependent derivative of the first signal with the second signal or the derivative thereof.

This and other receivers described herein can have one or more of at least the following characteristics.

In some implementations, the electrical 2×2 MIMO demultiplexer includes a feed-forward equalizer configured to output the frequency-dependent derivative of the first signal.

In some implementations, the receiver includes a controller configured to adjust taps of the feed-forward equalizer.

In some implementations, the electrical 2×2 MIMO demultiplexer includes a summer configured to add the frequency-dependent derivative of the first signal to the second signal or the derivative thereof.

In some implementations, the electrical 2×2 MIMO demultiplexer is configured to combine the frequency-dependent derivative of the first signal with a frequency-dependent derivative of the second signal.

In some implementations, the electrical 2×2 MIMO demultiplexer has a butterfly structure.

In some implementations, the electrical 2×2 MIMO demultiplexer includes a finite impulse response (FIR) filter on a cross-arm of the butterfly structure, the FIR filter configured to output the frequency-dependent derivative of the first signal.

In some implementations, the electrical 2×2 MIMO demultiplexer includes: a first splitter configured to split the first signal into a first electrical transmission path and a second electrical transmission path; a second splitter configured to split the second signal into a third electrical transmission path and a fourth electrical transmission path; a first finite impulse response (FIR) filter configured to apply a frequency-dependent transformation on the first electrical transmission path with controllable taps; a second FIR filter configured to apply a frequency-dependent transformation on the third electrical transmission path with controllable taps; a first summing element configured to sum an output from the first FIR filter and an output from the fourth electrical transmission path; and a second summing element configured to sum an output from the second adjustable gain element and an output from the second electrical transmission path.

In some implementations, the receiver includes at least one of: a third FIR filter configured to apply a frequency-dependent transformation on the fourth electrical transmission path with controllable taps and output to the first summing element; or a fourth FIR filter configured to apply a frequency-dependent transformation on the second electrical transmission path with controllable taps and output to the second summing element.

In some implementations, the receiver includes a digital signal processor that includes the electrical 2×2 MIMO demultiplexer.

In some implementations, the receiver includes: an optical 2×2 multi-input-multi-output (MIMO) demultiplexer configured to receive light from a first optical transmission path and a second optical transmission path; and a pair of photodetectors including (i) a first photodetector configured to detect a first demultiplexed output from the optical 2×2 MIMO demultiplexer and output a first electrical signal into a first electrical transmission path, and (ii) a second photodetector configured to detect a second demultiplexed output from the optical 2×2 MIMO demultiplexer and output a second electrical signal into a second electrical transmission path. The first signal is received at the electrical 2×2 MIMO demultiplexer from the first electrical transmission path, and the second signal is received at the electrical 2×2 MIMO demultiplexer from the second electrical transmission path.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

Figure 1:
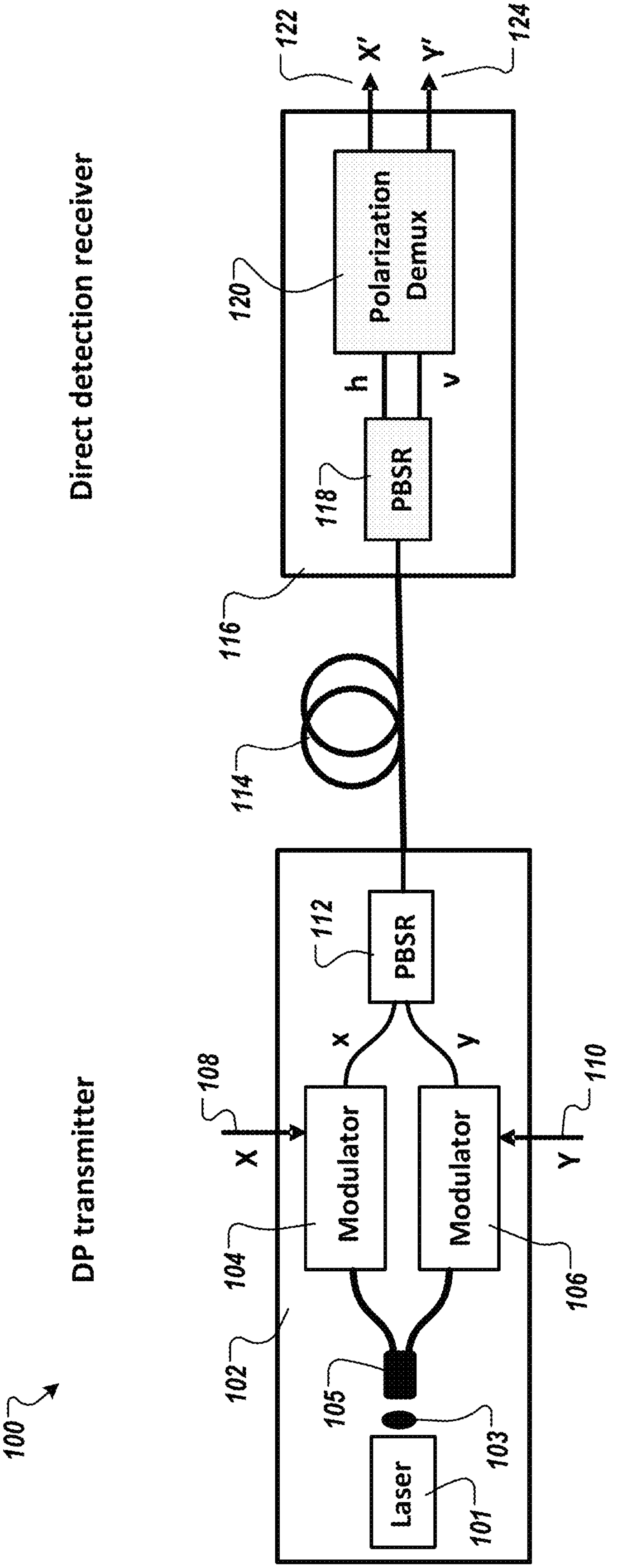
FIG. 1 illustrates an example of a dual-polarization (DP) communication system, according to some implementations of the present disclosure.

In general, multi-polarization detection is challenging because polarization states tend to drift as an optical waveform travels through a communication system (e.g., due to randomly changing birefringence in fiber transmission lines). Over a long-distance system, these random drifts of polarization can accumulate progressively without limit. In an optical communication system which uses polarization division multiplexing (PDM) to transmit different signals over the two polarizations of light, the random and unknown polarization drifting creates challenges for a receiver to accurately detect the proper orientation of the two polarization signals, resulting in the two signals becoming mixed at the receiver (sometimes referred to as "cross-talk"). In addition to polarization drift, other non-idealities in an optical communication system may degrade performance, such as polarization dependent loss (PDL), which amplifies or attenuates different polarizations differently.

To compensate for polarization drift and other non-idealities, a multi-polarization receiver can perform adaptive MIMO demultiplexing to separate and unmix the signals that are transmitted in the two polarizations. For an intensity-modulated direct-detect (IMDD) system, MIMO multiplexing may be primarily performed in the optical domain using optical phase shifters that operate directly on the received light signals This is because of square-law detection in an IMDD receiver.

Optical MIMO demultiplexing and electrical MIMO demultiplexing each have relative advantages. For example, optical demultiplexing can reduce power consumption, complexity, and sensitivity to the symbol rate. However, in the presence of polarization-dependent loss (PDL), polarization-mode dispersion (PMD), imperfect polarization splitting extinction ratio, and imperfect optical polarization tracking, optical MIMO demultiplexing will generally have a finite crosstalk that ultimately limits detection performance. In fact, if the system is not unitary, then it can be impossible for an optical MIMO demultiplexer to perfectly demultiplex both outputs simultaneously, unless the optical MIMO demultiplexer implements variable optical attenuators, which increases complexity. In such scenarios, an electrical MIMO demultiplexer that follows the optical MIMO demultiplexer may help efficiently remove this crosstalk for both output signals simultaneously. The optical and electrical demultiplexers need not be full demultiplexers individually, but in concert they can act as a net full demultiplexer. For example, the optical demultiplexer output may contain some crosstalk between the channels, and the electrical demultiplexer can provide crosstalk cancellation to cancel a finite level of crosstalk.

In a dual-polarization (DP) communication systems, two signals are multiplexed and transmitted using two different polarizations of light, thereby doubling the data capacity. At the receiver, detection can be performed by either coherent detection or direct detection (IMDD). In coherent detection, a local oscillator laser is implemented at the receiver to mix with the two received signals thereby detecting both the magnitude and phase of the optical field in each signal. By contrast, in IMDD, the receiver detects only the magnitude of the optical field (via the optical power) without requiring a local oscillator. The relative simplicity of IMDD makes it an attractive alternative to coherent detection in many scenarios. Also, transmission over an electrical cable is IMDD, so optical IMDD and electrical IMDD can share the same electronics, greatly reducing the cost of optical IMDD, because of the very large amount of electrical IMDD links used today.

However, the simplicity of direct detection can also create challenges in the context of PDM communication systems (e.g., a DP communication system). For example, if IMDD is utilized in a DP system, then information is transmitted only in the magnitude squared of the optical electric field (e.g., using pulse amplitude modulation) in each of the two signals. When the two DP-IMDD signals are direct-detected by photodetectors at the receiver via IMDD, the optical field in a direct-detection receiver undergoes non-linear squaring effects, which destroys the phase information in the two signals, preserving only their magnitudes. Therefore, it has generally been assumed that DP-IMDD systems require demultiplexing the two signals in the optical domain (before photodetection) with an optical demultiplexer. For these reasons, electrical demultiplexing has not been used in conjunction with direct detection in DP-IMDD systems.

Moreover, it was previously thought that, even if electrical demultiplexing may be implemented in conjunction with direct detection, such electrical demultiplexing was not compatible with "homodyne" configurations in which both optical signals have the same frequency (e.g., originating ultimately at the same optical source, such as a laser). For example, it was thought that signal-mixing in the non-linear case would result in non-linear terms that may be incompatible with electrical demultiplexing. However, for purposes of this disclosure, it has been recognized (e.g., based on optical simulations) that electrical demultiplexing can provide useful determination of output signals, for example, based on the extinction ratio of the optical signals.

According to implementations of the present disclosure, an electrical MIMO demultiplexer is used in homodyne multiplexing devices and systems. Homodyne here means that both polarization signals modulate the same laser source and thus have the same carrier frequency and phase. In some implementations, the electrical MIMO demultiplexer can be used in combination with an optical MIMO demultiplexer, for example, by using the optical MIMO demultiplexer to perform initial demultiplexing, and then using the electrical MIMO demultiplexer to perform additional demultiplexing to eliminate remnant crosstalk for the two output signals, resulting in very low crosstalk for both signals. For example, the optical MIMO demultiplexer can perform a majority of the demultiplexing task, and the electrical MIMO demultiplexer, receiving an output from the optical MIMO demultiplexer, can "clean up" the optically-demultiplexed signals. For purposes of this disclosure, it has been recognized that such joint optical and electrical demultiplexing can provide favorable results. As such, by implementing suitable configurations of the electrical MIMO demultiplexer, a receiver can implement electrical MIMO demultiplexing to perform polarization demultiplexing of the two signals in a homodyne DP-IMDD system without necessarily being limited to using only purely optical MIMO demultiplexing.

FIG. 1 illustrates an example of a DP communication system, according to implementations of the present disclosure.

The DP communication system 100 shown in FIG. 1 includes a transmitter 102 that includes a laser 101. The laser 101 can be any suitable type of laser, for example, a distributed-feedback laser (DFB), a vertical-cavity surface-emitting laser (VCSEL), or a laser diode. Light from the laser 101 is coupled to further optical elements by a lens 103 and provided to an optical splitter 105 (1×2 coupler) that splits the light and provides the split light into modulators 104, 106. In some implementations, the light from the laser 101 is infrared light, e.g., 1311 nm light emitted from a DFB. The splitter 105 can be fixed or variable. Other wavelengths of light are also within the scope of this disclosure.

Because modulation is performed using the modulators 104, 106 external to the laser 101, the laser 101 need not include integrated modulation, e.g., as an electro-absorption modulated laser (EML). This characteristic can provide increased design flexibility, decreased cost, and/or improved optical performance compared to systems that rely on EMLs for providing input light. Moreover, the use of the single laser 101 to provide the input light (e.g., as opposed to two or more light sources in heterodyne systems) can reduce system cost and complexity.

Modulators 104, 106 modulate the split light from the splitter 105 based on two different data streams 108 and 110 to generate two different modulated light signals (x and y). Throughout this disclosure, lower-case letters represent complex numbers (e.g., field) and upper-case letters represent real numbers (e.g., power). The first modulator 104 modulates the light in one optical transmission path with the first data stream 108 and the second modulator 106 modulates the light in other optical transmission path with the second data stream 110. The modulators 104, 106 can include, for example, silicon-photonic, InP, or $LiNbO_3$ modulators, to provide several non-limiting examples. The data streams 108, 110 can encode various types of data, such as PAM4, PAM6, PAM8, or DMT, to provide several non-limiting examples. The two modulated optical waveforms x and y share a common carrier frequency (e.g., the frequency of light emitted by the laser 101) modulated by the modulators 104, 106.

The two modulated optical waveforms x and y are combined in a polarization beam splitter and rotator (PBSR) 112, which converts one of the optical waveforms into a polarization orthogonal to the first. Throughout this disclosure, although examples are shown of a splitter implemented by a PBSR, other types of splitters can be used, including passive photonic integrated devices such as a polarization splitting grating coupler (PSGC). Moreover, throughout this disclosure, polarization rotation/alteration need not be performed in a combined optical element with splitting/combining but, rather, may be performed separately. For example, one of the optical waveforms x or y can be first rotated to have an orthogonal polarization, continue transmission on a transmission path, and then be combined with the other waveform x or y. After the PBSR 112, the two optical waveforms x and y co-exist in the same optical transmission path but have orthogonal polarizations. This dual-polarized (DP) optical waveform travels through a fiber link 114 or other transmission link. As the DP waveform travels through the fiber, various unknown and varying birefringence and twists in the fiber can cause changes in the polarizations of the two waveforms. If the fiber link 114 does not have significant polarization-dependent loss (PDL) and/or polarization-mode dispersion (PMD), then the two polarizations remain orthogonal. For example, x may evolve from a linear horizontal polarization to a right-hand circular polarization, which means that y evolves from a linear vertical polarization to a left-hand circular polarization. However, in the presence of PDL and/or PMD, the orthogonality of the polarizations in the DP optical waveform will degrade, which will complicate the demultiplexing of x and y.

At a receiver 116, the DP waveform enters a PBSR 118 which splits the DP waveform into two waveforms (h and v) which have orthogonal polarizations. The outputs of the PBSR 118 (h and v) are each a linear and orthogonal combination of x and y, plus additional noise. Moreover, h and v are expected to have the same or substantially the same carrier frequency as the modulated optical waveforms x and y, e.g., the frequency emitted by the laser 101. As such, the receiver 116 is configured as a homodyne receiver.

The two signals h and v then enter a polarization MIMO demultiplexer 120 to extract estimates 122 and 124 (X' and Y', or X" and Y" as discussed below) of the original signals X and Y from the received optical signals h and v. The polarization MIMO demultiplexer 120 can be implemented at least partially via electrical MIMO demultiplexing, as described in further detail below.

The polarization MIMO demultiplexer 120 implements direct detection (e.g., as part of an IMDD system). As discussed above, in IMDD systems, the nonlinearity of photodetection can result in a loss of optical phase information, which can render it impossible to recover the original signals X and Y. This is because when the received signals (h and v) are detected by photodetectors in the receiver 116, the optical field in a direct-detection receiver 116 undergoes non-linear squaring effects, which can destroy the phase information in the two signals h and v.

Detection scenarios can be classified based on frequencies of the transmitted/received signals. When the two optical signals (e.g., x and y at the transmitter 102, and h and v at the receiver 116) having the two polarizations have the same carrier frequency, the scenario can be referred to as a "completely overlapping" or "homodyne" multiplexing scenario. When the two carrier frequencies are separated with a frequency difference that is small compared to the signal symbol rate. This scenario can be referred to as a "partially overlapping" or "intradyne" multiplexing scenario. In both homodyne and intradyne multiplexing scenarios, the relative phase between the two optical signals affects the photodetected signals at the receiver 116.

In the homodyne and intradyne scenarios, optical MIMO demultiplexing can be performed to recover approximations of x and y, referred to herein as x' and y' in amplitude and X' and Y' in optical power. However, X' and Y' are not identical to X and Y but, rather, include left-over crosstalk due to imperfect optical demultiplexing. For example, polarization-dependent loss and finite polarization combiner and splitter extinction ratios can degrade the performance of an optical MIMO demultiplexer. In some implementations described herein, output from an optical MIMO demultiplexer is provided to an electrical MIMO demultiplexer that, configured as described herein, can remove some or substantially all of the cross-talk and recover more-accurate versions of X and Y-referred to as X" and Y"—than would be recovered by optical MIMO demultiplexing alone.

Figure 2:
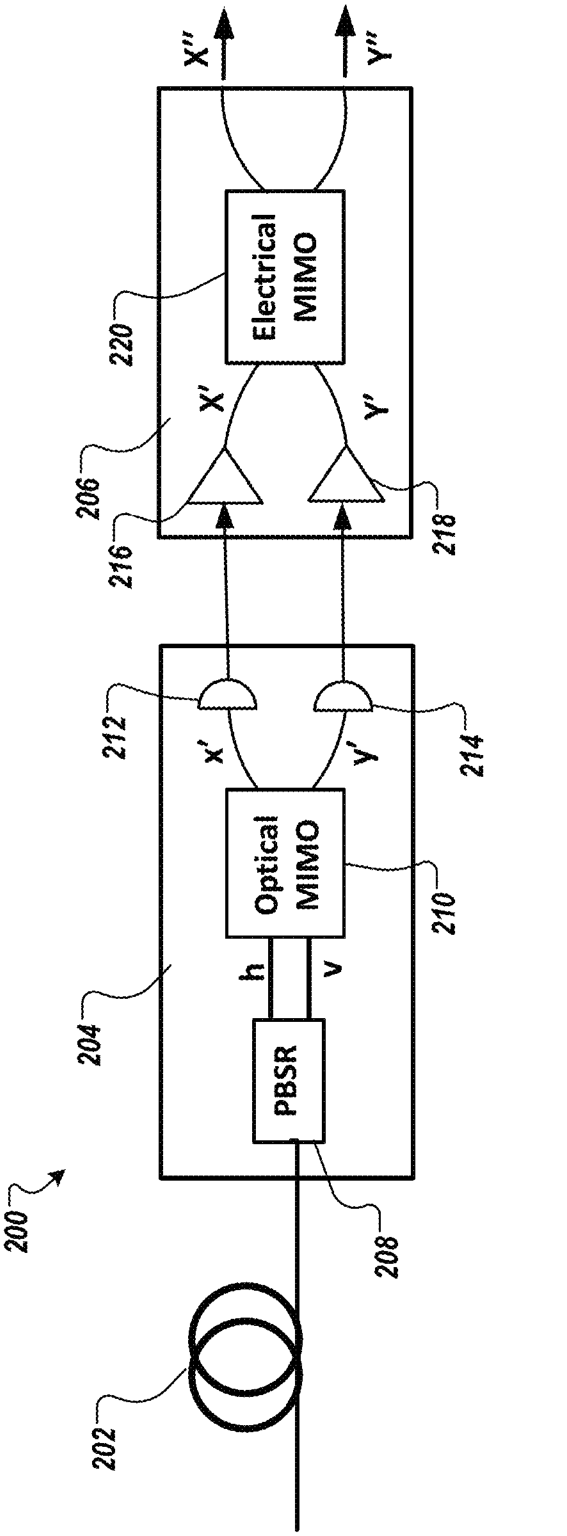
FIG. 2 illustrates an example of a DP intensity modulated direct detection (IMDD) receiver that utilizes electrical multiple-input-multiple-output (MIMO) demultiplexing, according to some implementations of the present disclosure.

FIG. 2 illustrates an example of a receiver 200 in a homodyne DP-IMDD communication system, the receiver 200 utilizing a combination of optical MIMO demultiplexing and electrical MIMO demultiplexing, according to some implementations of the present disclosure. The receiver 200 is a direct detection receiver configured to receive and demultiplex DP-IMDD signals that are homodyne-multiplexed (e.g., in which the two received optical signals h and v in the two polarizations have the same carrier frequency). The receiver 200 can be used, for example, as the receiver 116 in the system 100. However, the receiver 200 need not be used in conjunction with the transmitter 102 but, rather, can be generally used to receive and process dual-polarized optical waveforms from various sources.

In this example, the receiver 200 includes an optical module 204 and an electrical module 206, where the optical module 204 receives optical signals and performs optical demultiplexing, and the electrical module 206 receives electrical signals and perform electrical demultiplexing. For example, in some implementations, the optical module 204 and the electrical module 206 can be implemented as/in separate chips, e.g., a photonic integrated circuit and an electrical integrated circuit, respectively. However, the modules 204, 206 need not be implemented separately but, rather, can be combined with one another in various combinations and forms, without departing from the scope of this disclosure.

At the receiver 200, a dual-polarized optical waveform (e.g., from the transmitter 102) carried by a fiber link 202 enters a PBSR 208 which splits the DP waveform into two optical waveforms (h and v, transmitted on respective optical transmission paths) that have orthogonal polarizations. Due to one or more effects (e.g., the optical communication system not using polarization-maintaining fiber), the optical outputs of the PBSR 208 (h and v) are each a linear and orthogonal combination of the originally transmitted optical signals x and y. As an example, h can be a linear combination of x and y, and similarly v can be a linear but orthogonal combination of x and y. For example, h can be equal to (x−y)/sqrt(2) and v can be equal to (x+y)/sqrt(2). In practice, the received signals h and v may contain additive noise, such as thermal noise in the receiving electronics; however, this disclosure will assume a noiseless scenario for the purposes of discussion, with the understanding that the systems, devices, and processes described can also be applied in, and function in, scenarios that include noise.

The two optical signals (light) h and v are input to an optical MIMO demultiplexer 210, which performs an initial step of demultiplexing in the optical domain to output optical signals (light) x' and y' on respective optical transmission paths. Examples of the optical MIMO demultiplexer 210 are discussed with respect to FIG. 3. The optical signals x' and y' may be demultiplexed to some extent as a result of the optical MIMO demultiplexer 210, but may still have some residual additional components due to crosstalk, for example, due to imperfect demultiplexing in the optical MIMO demultiplexer 210 or PDL or PMD in the optical fiber. For example, the optical MIMO demultiplexer 210 can output x' and y' such that h contains significantly different portions of x' and y', and likewise such that v contains significantly different portions of x' and y', but with x'≠x and y'≠y. For example, in the presence of polarization-dependent loss (PDL), polarization-mode dispersion (PMD), imperfect polarization splitting extinction ratio, and/or imperfect optical polarization tracking, the optical MIMO demultiplexer 210 can result in a finite amount of crosstalk between the optical signals x' and y' which degrades detection performance. For example, if the system is not unitary, then it may be impossible or prohibitively difficult for the optical MIMO demultiplexer 210 to completely demultiplex h and v to recover both outputs x' and y' simultaneously. In some cases, cross-talk may be reduced by including variable optical attenuators in the optical MIMO demultiplexer 210; however, this may introduce unacceptable complexity/cost. In some implementations, the optical MIMO demultiplexer 210 is endless, e.g., as discussed in reference to FIG. 6.

For example, in the case where x=$u_1$ and y=$u_2$, the output of the optical MIMO demultiplexer 210 (x' and y') can be represented in matrix form as the following Equation 1:

$$u = \begin{bmatrix} u_1 + \varepsilon_{12} e^{j\varphi_{12}} u_2 \\ u_2 + \varepsilon_{21} e^{j\varphi_{12}} u_1 \end{bmatrix}$$

where $\varepsilon_{12}$ and $\varepsilon_{21}$ are positive, real numbers (e.g., having values much less than 1) and represent unwanted crosstalk, and where $\phi_{12}$ and $\phi_{21}$ are phases. One can assume $u_1$ and $u_2$ are purely real, because their absolute phases are not important for this analysis. $\varepsilon_{12}$ and $\varepsilon_{21}$ represent magnitudes of cross-talk, such that $\varepsilon_{12}e^{j\varphi_{12}}u_2$ and $\varepsilon_{21}e^{j\varphi_{21}}u_1$ are non-ideal cross-talk terms.

Therefore, as discussed above, in some scenarios the optical 2×2 MIMO demultiplexer can, at times, provide only partial demultiplexing for one or both of the pair of optical signals x' and y' that are output from the optical 2×2 MIMO demultiplexer.

Accordingly, as shown in FIG. 2, an electrical MIMO demultiplexer 220 performs a subsequent step of demultiplexing in the electrical domain to remove this residual crosstalk for both outputs simultaneously, resulting in very low crosstalk for both signals and accurate output of X" and Y" to recover X and Y. In the example of FIG. 2, the optical signals x' and y' that are output from the optical MIMO demultiplexer 210 are photodetected by respective photodetectors 212, 214. Because, in the homodyne case discussed herein, the optical signals x' and y' share a common carrier frequency (e.g., the frequency emitted by the laser providing input light that was split and modulated), the photodetectors 212, 214 can be configured to detect light at the common carrier frequency. For example, the photodetectors 212, 214 can be identical. The photodetectors 212, 214 can include, for example, Ge or InGaAs photodetectors.

Figure 3:
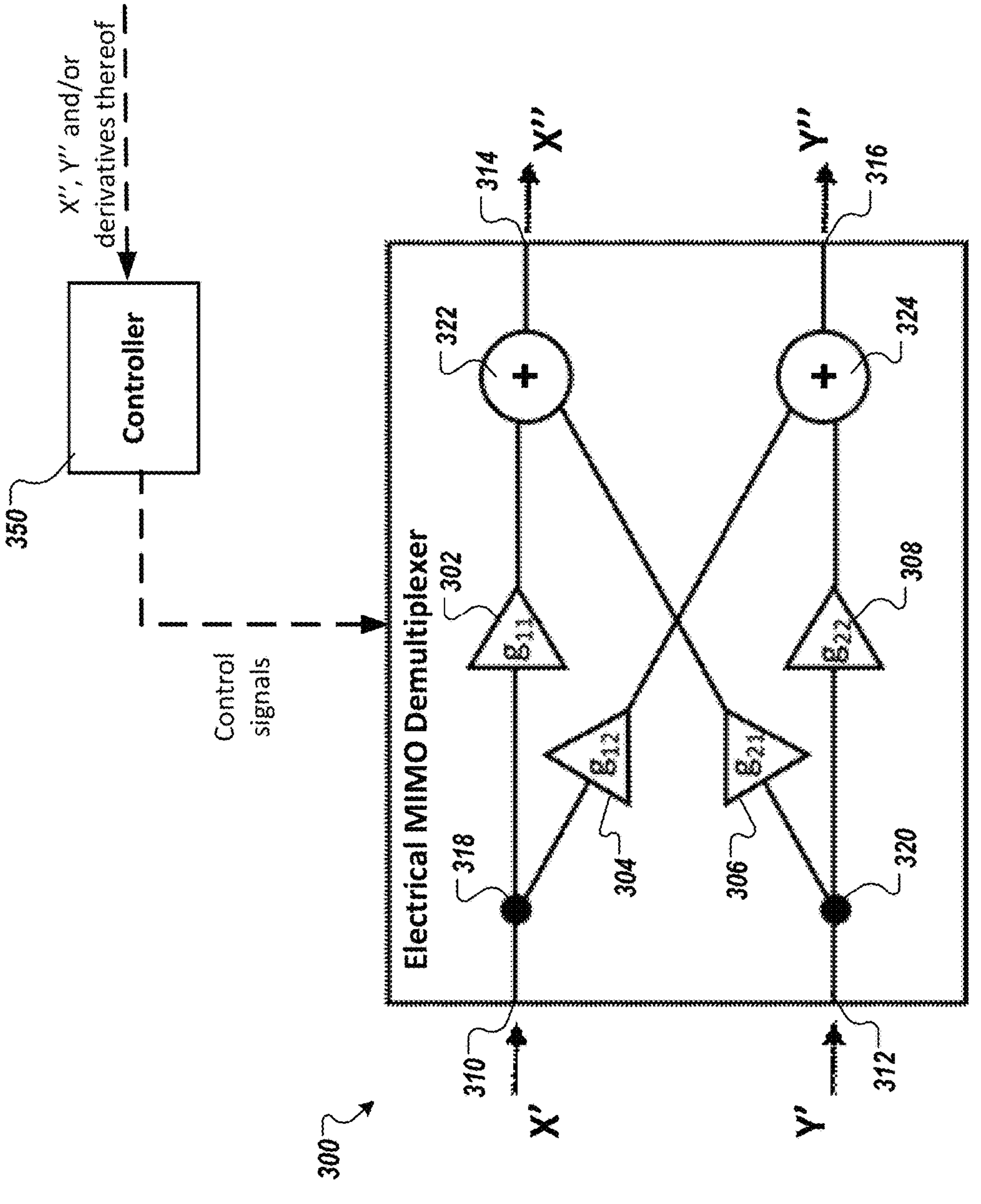
FIG. 3 illustrates an example of a DP-IMDD electrical MIMO demultiplexer, according to some implementations of the present disclosure.

The photodetectors 212, 214 detect the optical signals x' and y' and output electrical signals (e.g., currents and/or voltages) X' and Y' representing the power of respective optical fields of the optical signals x' and y'. The signals from the photodetectors 212, 214 are optionally provided into transimpedance amplifiers 216, 218 that produce amplified versions of the signals from the photodetectors, also referred to as X' and Y'. The transimpedance amplifiers may contain an electrical 2×2 MIMO demultiplexer. This demultiplexer may be a full or partial demultiplexer including a butterfly network as shown in FIG. 3, in which a controllable portion from one path is added to the other path and vice versa. A full 2×2 MIMO demultiplexer can demultiplex any linear combination of input signals, and a partial 2×2 MIMO demultiplexer, in some cases, can demultiplex only a limited amount of crosstalk between in the input signals.

Continuing in reference to Equation 1 above, and assuming that $u_1$ is associated with a power $p_1$ and $u_2$ is associated with a power $p_2$, the outputs of the photodetectors 212, 214 (X' and Y') can be represented in matrix form as the following Equation 2:

$$p = \begin{bmatrix} p_1 + \varepsilon_{12}^2 p_2 + 2\varepsilon_{12}\cos\varphi_{12}\sqrt{p_1 p_2} \\ p_2 + \varepsilon_{21}^2 p_1 + 2\varepsilon_{21}\cos\varphi_{21}\sqrt{p_1 p_2} \end{bmatrix}$$

Equation 2 presents challenges for electrical demultiplexing because of the presence of the non-linear square root terms and the products of $p_1$ and $p_2$. These non-linear terms mean that linear electrical compensation cannot fully recover $u_1$ and $u_2$.

However, for purposes of this disclosure, it has been recognized that, in many cases, linear electrical demultiplexing can provide useful processing. The powers $p_i$ can each be represented as the sum of a direct-current (DC) term DC and an alternating-current (AC) term s(t), e.g., as $p_i(t)=c_i+s_i(t)$. For purposes of this disclosure, it has been recognized that the magnitude of $s_i(t)$, $|s_i(t)|$, is significantly less than c; for typical IMDD signals. For example, in the case of an extinction ratio of 3 dB, $|s_i(t)|/c;<0.33$. This recognition allows an approximation that permits linear compensation. Assuming $s_i(t)|/c;<<1$, p can be approximated as the following Equation 3:

$$p_{AC} \approx \begin{bmatrix} s_1 + \varepsilon_{12}^2 s_2 + 2\varepsilon_{12}\cos\varphi_{12}\sqrt{c_1 c_2}\left(\frac{s_1}{c_1} + \frac{s_2}{c_2}\right) \\ s_1 + \varepsilon_{21}^2 s_1 + 2\varepsilon_{21}\cos\varphi_{21}\sqrt{c_1 c_2}\left(\frac{s_1}{c_1} + \frac{s_2}{c_2}\right) \end{bmatrix}$$

Because Equation 3 has only linear terms in $s_1$ and $s_2$, a linear electrical compensation network can be used to perform electrical MIMO demultiplexing.

Continuing in reference to FIG. 2, the electrical signals X' and Y' are then input to an electrical MIMO demultiplexer 220 which performs demultiplexing in the electrical domain to produce separate signals X" and Y". X" and Y" represent recovered versions of the data streams 108, 110 (X and Y) shown in FIG. 1. Based on the use of two-stage demultiplexing with both optical and electrical portions, in some implementations, X and Y can be recovered more accurately, e.g., than if only optical or only electrical demultiplexing were performed. For example, even if the optical MIMO demultiplexing is partial (e.g., imperfect optical MIMO demultiplexing), the subsequent step of electrical MIMO demultiplexing can serve to clean up the signal (e.g., remove residual crosstalk from the outputs of the optical MIMO demultiplexing).

Moreover, electrical MIMO demultiplexing can provide various technical benefits, such as extremely fast operation, no or little incurred optical losses from an optical polarization demultiplexer, and facile compensation of polarization-dependent loss (PDL) and polarization-mode dispersion (PMD).

Figure 4A:
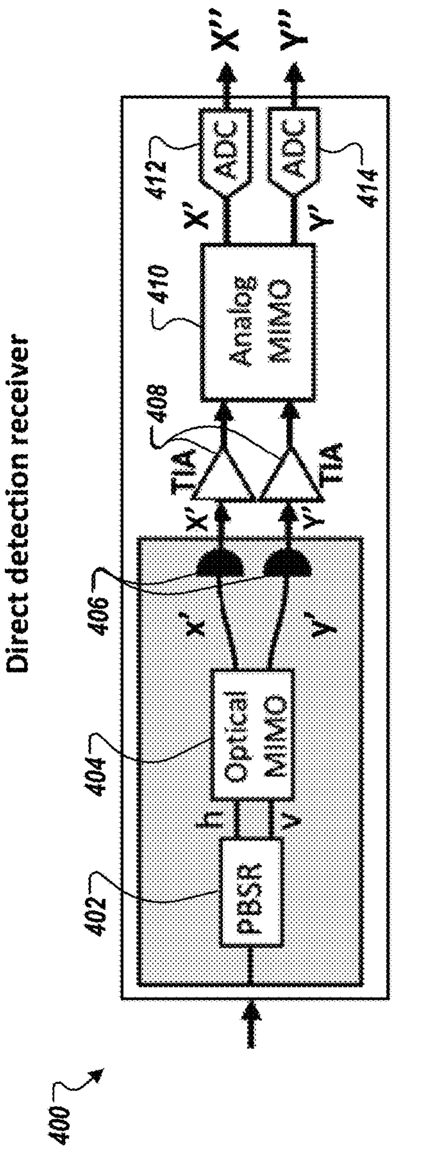
FIGS. 4A and 4B illustrate different examples of receivers that utilize IMDD with a combination of optical and electrical MIMO demultiplexing, according to some implementations of the present disclosure.
Figure 4B:
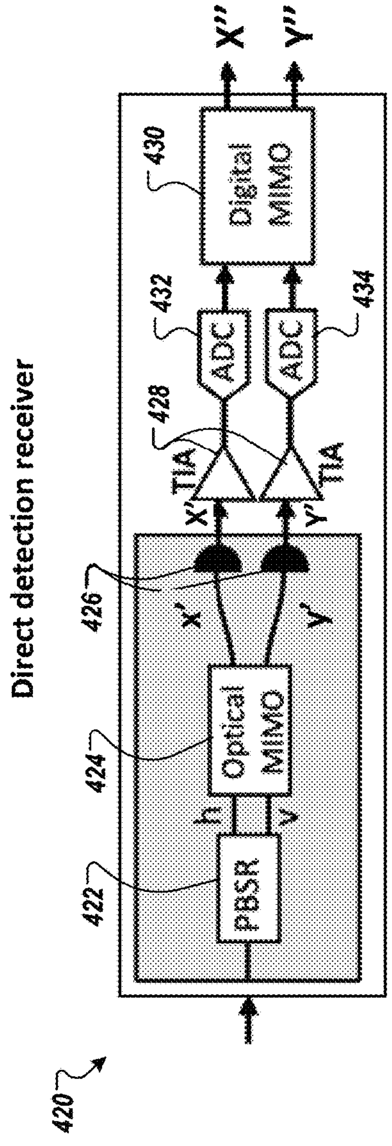
Figure 5:
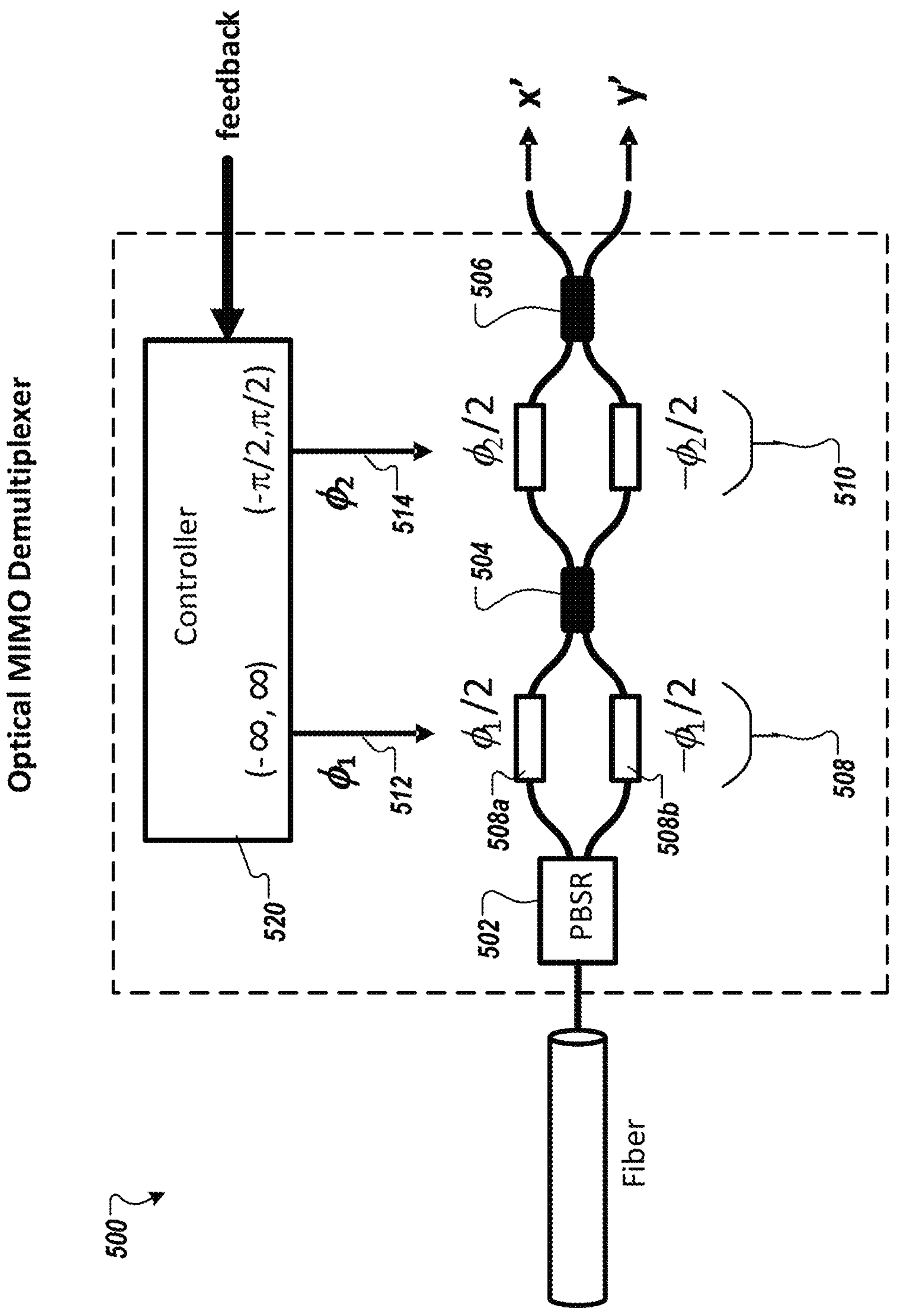
FIG. 5 illustrates an example of an optical MIMO polarization demultiplexer with two phase control signals.
Figure 6:
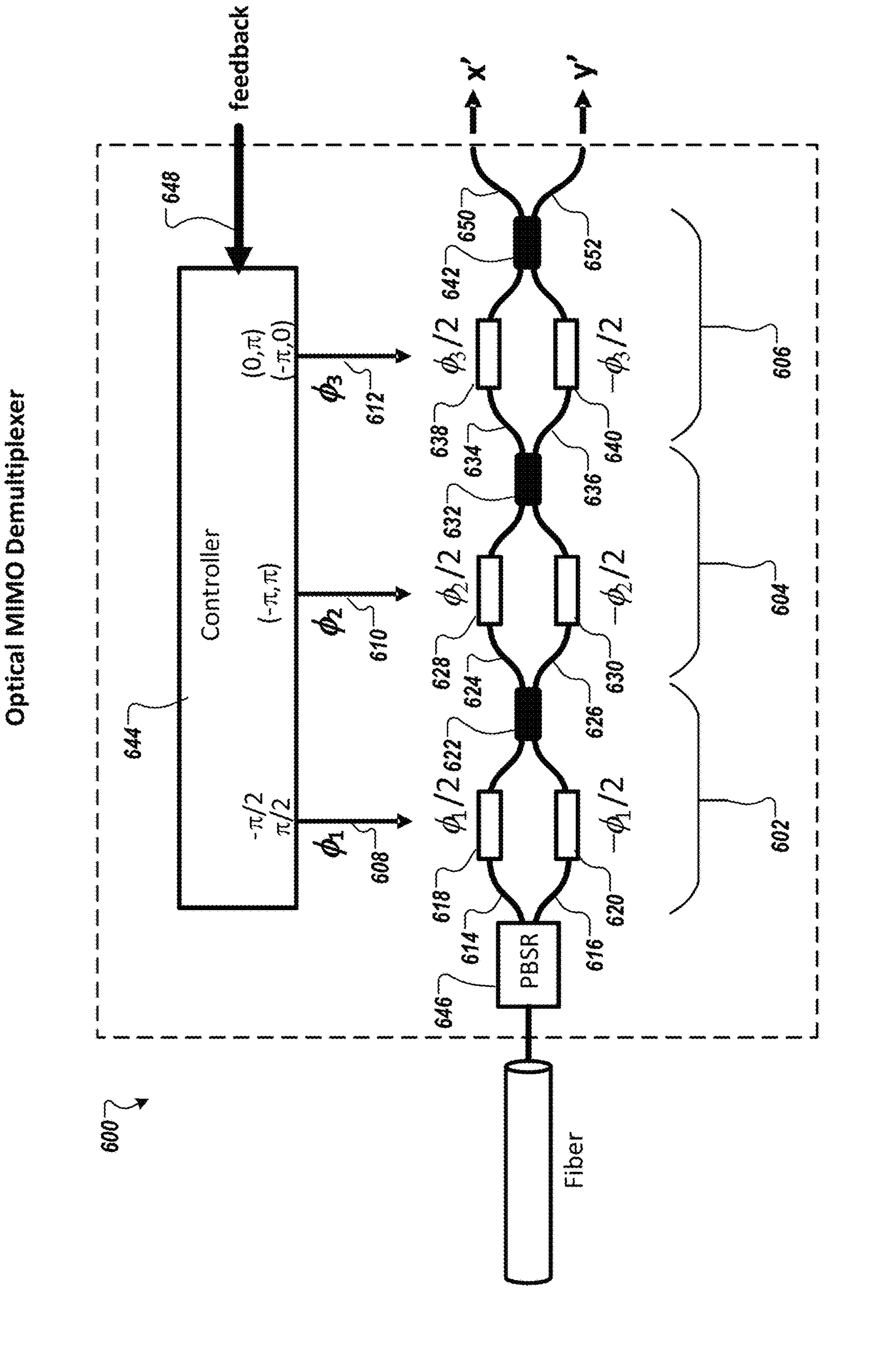
FIG. 6 illustrates an example of an optical MIMO polarization demultiplexer with three phase control signals.

FIGS. 3-6 present various examples of MIMO demultiplexers, including electrical MIMO demultiplexers (in FIGS. 3, 4A, and 4B) and optical MIMO demultiplexers (in FIGS. 5 and 6). In all of these examples, the MIMO demultiplexers attempt to separate two received signals into two different polarizations, and thereby recover the original signals X and Y. For two orthogonal states of polarization, a DP optical communication system can be represented as a 2×2 MIMO channel. Thus, optical transmission in such a system can be modeled as a 2×2 matrix F. The matrix F is a transfer function describing polarization effects and chromatic dispersion of communication from transmitter to receiver. For example, the matrix F can model the effects of a fiber that connects a transmitter and receiver (e.g., fiber link 114 or 202), as well as the effects of the optical component(s) in the transmitter and/or receiver themselves. For purposes of this disclosure, the matrix F will be referred to as a "channel matrix F" with the understanding that the "channel" can represent various effects of the optical communication system, such as the fiber transmission line and component(s) of the transmitter and/or receiver. The channel matrix F acts on modulated, original signals x and y to obtain h and v as follows:

$$\begin{bmatrix} h \\ v \end{bmatrix} = F\begin{bmatrix} x \\ y \end{bmatrix}$$

To estimate the original signals x and y from the received signals h and v, an optical demultiplexer matrix D is applied at the receiver, to generate estimates x' and y' as shown below. For example, the matrix D can be applied by the optical MIMO demultiplexer 210.

$$\begin{bmatrix} x' \\ y' \end{bmatrix} = DF\begin{bmatrix} x \\ y \end{bmatrix}$$

Then, as long as x'=ax and y'=bx (where "a" and "b" are complex constants), the receiver will have successfully demultiplexed the polarizations.

FIG. 3 illustrates an example of an electrical MIMO demultiplexer 300 according to some implementations of the present disclosure. The electrical MIMO demultiplexer 300 of FIG. 3 can be used, for example, as the electrical MIMO demultiplexer 220 of FIG. 2.

The electrical MIMO demultiplexer 300, a 2×2 demultiplexer, can be implemented using various techniques, such as a "butterfly" network with variable gain elements 302, 304, 306, and 308, as shown in FIG. 3. Respective gain values g11, g12, g21, and g22 of the variable gain elements 302, 304, 306, 308 can be positive or negative and can be adjusted continuously to account for polarization changes from the fiber link.

For example, as shown in FIG. 3, a controller 350 can provide control signals to one or more of the variable gain elements 302, 304, 306, 308 to set the gain values g11, g12, g21, and/or g22. The control signals can include currents and/or voltages and can be analog and/or digital signals. In some implementations, the controller 350 adjusts the gain values using control feedback. For example, as shown in FIG. 3, the controller 350 can receive output signals X" and Y" from outputs 314 and 316 of the electrical MIMO demultiplexer 300, or derivatives thereof (e.g., filtered, analog-to-digital converted (ADC), digital-to-analog converted (DAC), and/or otherwise processed versions of the output signals X" and Y" and/or data obtained by processing the output signals X" and Y", e.g., by comparing the output signals X' and Y' to other signals, etc.). For example, in some implementations, markers (e.g., tone signals) are placed on the signals at the transmitter, e.g., are included in the data streams 108, 110 or otherwise embedded in the signals x and y by the modulators 104, 106. The markers can be detected by the controller 350 in the signals fed-back into the controller 350, and the controller 350 can generate the control signals based on the markers. For example, the controller 350 can adjust the control signals so as to optimize one or more figures of merit based on the markers, e.g., to maximize eye opening, minimize bit-error count, maximize a signal quality, minimize an unwanted tone marker, and/or apply other known signal quality monitoring technique(s). In some implementations, the feedback is based on tracking polarizations of the signals fed-back to the controller 350.

In some implementations, the controller 350 uses a feedback signal that represents the demultiplexing performance and uses that the feedback signal to control the variable gain elements 302, 304, 306, and/or 308 in the electrical butterfly network. The feedback signal can represent, for example, the estimated signal-to-noise ratio of the post-butterfly received signals X" and Y". For example, the controller 350 can adjust g12 and g21 to maximize the signal-to-noise ratios of X" and Y".

The 2×2 electrical MIMO demultiplexer 300 is a "butterfly" network and includes two inputs (310 and 312) and two outputs (314 and 316). Input signals X' and Y', provided at the inputs 310 and 312, are each split into two copies by splitters 318 and 320. Each copy proceeds through an amplifier/attenuator with a controllable gain (a variable gain element). The gain can be positive or negative (inverting). This distinguishes the homodyne electrical demultiplexing configuration over some heterodyne electrical demultiplexing scenarios, in which only negative gain values can be used for g12 and g21.

For example, a first copy of signal X' experiences gain g11 (through gain element 302) and a second copy of signal X' experiences gain g12 (through gain element 304), while a first copy of signal Y' experiences gain g21 (through gain element 306), and a second copy of signal Y' experiences gain g22 (through gain element 308). The output of the gain element 302 with gain value g11 is added to the output from the gain element 306 with gain value g21 by a summing element 322, and the result is sent to output 314. Similarly, the output of the gain element 304 with gain value g12 is added to the output of the gain element 308 with gain value g22 by a summing element 324, and the result is sent to output 316.

In some implementations of the present disclosure, the gain values are controlled (e.g., by configuration of the controller 350 to generate control signals that set the gain values) such that $|g12| \ll |g11|$ and $|g21| \ll |g22|$. Also, in some implementations, the sign of g12 is controlled to be opposite to that of g11, and the sign of g21 is controlled to be opposite to that of g22. Furthermore, in some implementations, the gain values g11 and g22 are fixed, and only the gain values g12 and g21 are adjusted by the controller 350, e.g., based on tracking the polarization of the signals fed-back to the controller 350. For example, in some implementations, g11 is equal to 1, g22 is equal to 1, g12 is controlled to be in a range of values −0.25 to 0.25, and g21 is controlled to be in a range of values −0.25 to 0.25.

Gain elements 302 and 308 (having gains 302 and 308) are optional and need not be included, e.g., can be replaced in the demultiplexer 300 with short circuits. For example, the summing element 322 can receive inputs from splitter 318 and from the output of gain element 306 (g21), and/or the summing element 324 can receive inputs from splitter 320 and from the output of gain element 304 (g12).

In addition, in some implementations, only one of the two gain elements 304, 306 (g12, g21) is included. For example, the other can be replaced by a short circuit. For example, the summing element 322 can receive input from splitter 320, or the summing element 324 can receive input from splitter 318.

Further, the architecture of the 2×2 electrical MIMO demultiplexer is not limited to that of FIG. 3. The 2×2 electrical MIMO demultiplexer can include (i) at least one adjustable gain element configured to apply an adjustable gain on a first of the two input electrical signals or a derivative thereof, and (ii) at least one element configured to combine the output from the at least one adjustable gain element, or a derivative thereof, with the other of the two input electrical signals, or a derivative thereof. For example, in the case of the 2×2 electrical MIMO demultiplexer 300, gain elements 304, 306 are configured to apply adjustable gains on X' and Y', respectively, and to provide outputs to summers 324, 322, respectively, which combine those respective outputs with derivatives of Y' and X', respectively (e.g., Y' and X' acted on by gain elements 308, 302, respectively).

The at least one adjustable gain element can be arranged on a cross-arm of the butterfly configuration. "Cross-arms" or "cross-paths" in the example of FIG. 3 are the signal lines having the gain elements 304, 306. "Bar-arms" or "bar-paths" in the example of FIG. 3 are the signal lines having the gain elements 302, 308.

In some implementations, the at least one adjustable gain element is configured to apply a positive gain, a configuration incompatible with some heterodyne demultiplexing scenarios but which can provide effective electrical demultiplexing in the homodyne context.

In some implementations, the at least one adjustable gain element is on a cross-arm and is configured to apply a gain that is of the same sign as a gain applied on a bar-arm of the demultiplexer. For example, in the example of FIG. 3, a sign of the gain applied by gain element 304 can be the same as a sign of the gain applied by gain element 302 and/or 308. This configuration is incompatible with some heterodyne demultiplexing scenarios but can provide effective electrical demultiplexing in the homodyne context. The foregoing gains can be total gains on the cross-arm/bar-arm.

The at least one combining element can be, for example, a summer or another type of circuit element that produces an output based on two inputs.

As another example of a structure of the 2×2 electrical MIMO demultiplexer, compared to the structure in FIG. 3, a gain element can be included before one or both splitters 318, 320, and a gain element can be included in one or both cross-arms. For example, a first gain element can be included before splitter 318, and the gain element 304 (g12) can also be included, on a cross-arm.

In some implementations, the gain value g21 is adjusted based on characteristics of output signal X" (optionally, though not necessarily, without being based on characteristics of output signal Y"), and/or the gain value g12 is adjusted based on characteristics of output signal Y" (optionally, though not necessarily, without being based on characteristics of output signal X"). For example, in some implementations, the controller 350 is configured to adjust the gain value g21 to maximize the signal quality or minimize the unwanted tone marker in output X", and the controller 350 is configured to adjust the gain value g12 is to maximize the signal quality or minimize the unwanted tone marker in output Y". In some implementations, taps can be implemented with different time delays and gains. This allows the creation of frequency-dependent gains.

Based on Equation 3 above, in some implementations, the controller 350 is configured to control gain element 304 such that g12 satisfies or substantially satisfies the following Equation 4:

$$g_{12} \approx \frac{-\varepsilon_{12}^2 - \varepsilon_{12}\cos\varphi_{12}\sqrt{\frac{c_1}{c_2}}}{1 + \varepsilon_{12}\cos\varphi_{12}\sqrt{\frac{c_2}{c_1}}}$$

The controller 350 can further be configured to control gain element 306 such that g21 satisfies or substantially satisfies the following Equation 5:

$$g_{21} \approx \frac{-\varepsilon_{21}^2 - \varepsilon_{21}\cos\varphi_{21}\sqrt{\frac{c_2}{c_1}}}{1 + \varepsilon_{21}\cos\varphi_{21}\sqrt{\frac{c_1}{c_2}}}$$

In conjunction with control according to Equations 4 and 5, g11 and g22 (whether by control by the controller 350 and/or by a preset configuration) can be set substantially equal to 1, e.g., g11=g22=1. It will be understood that the controller 350 need not explicitly calculate g12 and g21 as set forth in Equations 4 and 5. Rather, in some implementations, by adjusting the gain elements 304 and 306 to optimize one or more figures of merit, the controller 350 will implement Equations 4 and 5.

The 2×2 electrical MIMO demultiplexer can be implemented in analog electronics and/or digital clectronics. In some implementations, the 2×2 electrical MIMO demultiplexer is implemented as analog electronics as part of a transimpedance amplifier (TIA) chip that includes the TIAs 216, 218. In some implementations, the 2×2 electrical MIMO demultiplexer is implemented as digital electronics as part of a digital signal processor (DSP), e.g., a DSP that obtains the output signals X" and Y". For example, the DSP can include the digital MIMO 430 and ADCs 432, 434 discussed with respect to FIG. 4B below.

FIGS. 4A and 4B illustrate examples of receivers that utilize IMDD with a combination of electrical MIMO demultiplexing and optical MIMO demultiplexing, according to some implementations of the present disclosure. In particular, the examples of FIGS. 4A and 4B show the electrical MIMO demultiplexing incorporated with an analog implementation (FIG. 4A) and with a digital implementation (FIG. 4B).

In the examples of direct detection receivers 400 and 420 of FIGS. 4A and 4B, the DP waveform enters a PBSR (402 and 422) which splits the DP waveform into two waveforms, h and v, which have orthogonal polarizations and a common carrier frequency. The two optical signals h and v are then input to an optical MIMO demultiplexer (404 and 424), which performs an initial step of optical MIMO demultiplexing to output optical signals x' and y'. The optical signals x' and y' are photodetected by photodetectors (406 and 426), resulting in electrical signals X' and Y', which can be amplified by transimpedance amplifiers (TIAs 408 and 428). At this point, the amplified electrical signals (which are analog) can be either directly processed by an analog electrical MIMO demultiplexer (as in FIG. 4A) or converted into the digital domain and processed by a digital electrical MIMO demultiplexer (as in FIG. 4B).

In the example of FIG. 4A, the amplified electrical signals X' and Y' are processed by an analog electrical MIMO demultiplexer 410, and the outputs X' and Y' in analog form are then converted into the digital domain by analog-to-digital converters (ADC 412 and 414). As such, the electrical MIMO demultiplexer 410 performs analog-domain demultiplexing to separate signals X' and Y' as outputs. An advantage of doing the electrical MIMO demultiplexing in the analog domain is that subsequent digital electronics (e.g., a digital PHY) can be relatively general-use electronics, e.g., a conventional digital IMDD PHY. For example, performing the electronic MIMO demultiplexing in the analog portion of the receiver can allow the demultiplexing to be finished before signals reach any digital electronics. This allows the digital electronics (e.g., the controller 350 and/or other electronics, such as a DSP) to not be specially-configured electronics having use limited to dual-polarized systems. Accordingly, the same digital electronics can be used for a single-polarization (SP) or DP system. For example, this allows the use of the DP direct detection receivers described herein in linear pluggable optic (LPO) applications. Moreover, an analog electrical MIMO demultiplexer can receive the outputs of a pair of transimpedance amplifiers as shown in FIG. 4A.

In the example of FIG. 4B, the amplified electrical signals X' and Y' are first converted into the digital domain by analog-to-digital converters (ADC 432 and 434) and then processed by a digital electrical MIMO demultiplexer 430 to produce digital output signals X" and Y". As such, the electrical MIMO demultiplexer 430 performs digital domain demultiplexing to obtain separate signals X" and Y" as outputs. Some advantages of electrical MIMO demultiplexing in the digital domain include more flexibility in the design, case of implementing more taps with different time delays (e.g., to compensate for PMD), and more opportunities to enhance performance.

The electrical MIMO demultiplexer 300 and other electrical MIMO demultiplexer architectures within the scope of this disclosure can be implemented in analog or digital form, e.g., as the analog electrical MIMO demultiplexer 410 or as the digital electrical MIMO demultiplexer 430, including variable gain elements, summing elements, etc.

Figure 8:
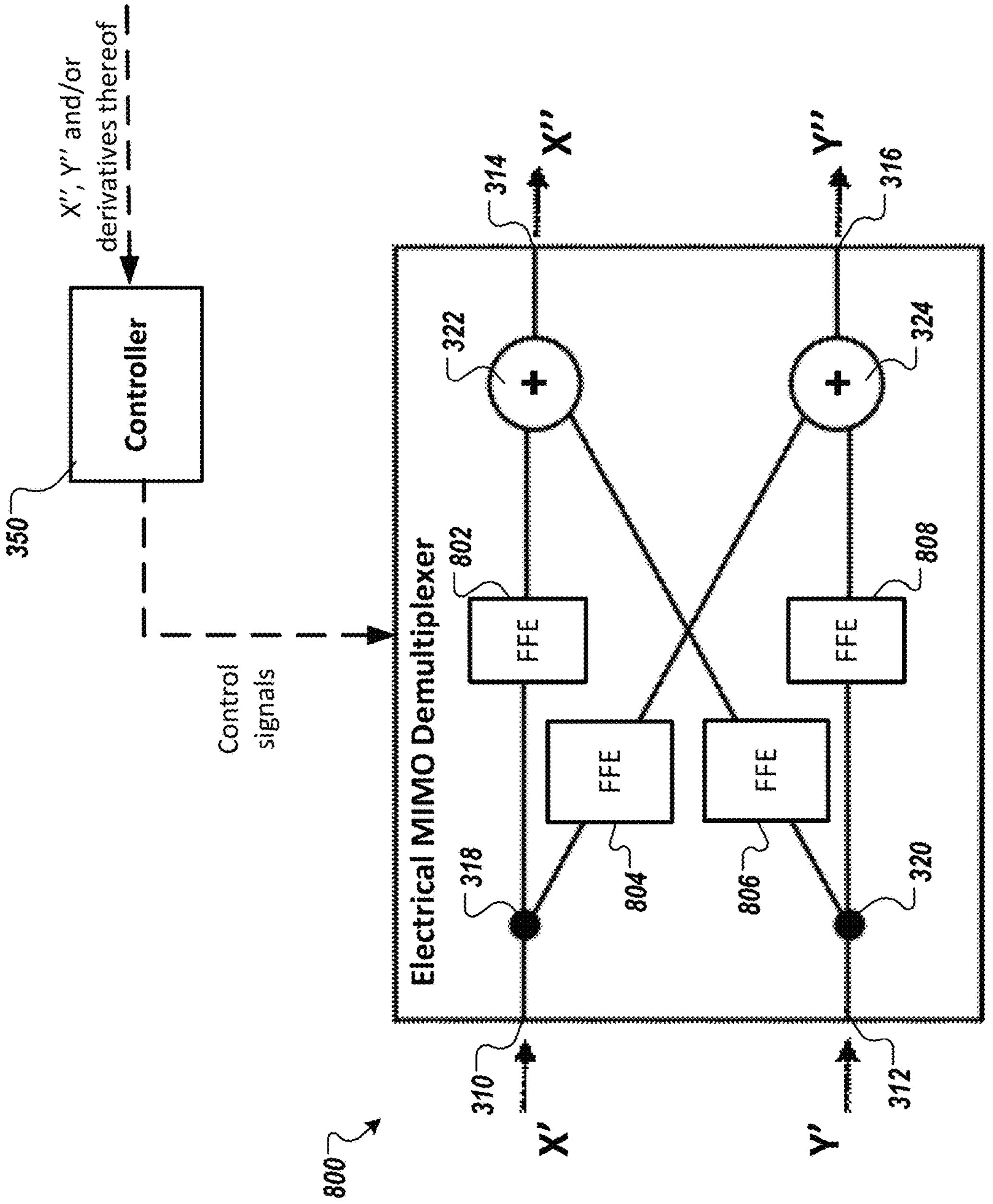
FIG. 8 illustrates an example of an electrical MIMO demultiplexer.

In some implementations, the 2×2 electrical MIMO demultiplexer includes frequency-dependent elements. For example, the 2×2 electrical MIMO demultiplexer can include finite impulse response (FIR) filters, such as taps and delays. FIG. 8 illustrates an example of such an electrical MIMO demultiplexer 800. Elements of the electrical MIMO demultiplexer 800 can have the same characteristics as the corresponding elements of the electrical MIMO demultiplexer 300, except where noted otherwise or suggested otherwise by context.

As shown in FIG. 8, the electrical MIMO demultiplexer 800 has the same butterfly configuration as the electrical MIMO demultiplexer 300, except that the gain elements 302, 304, 306, 308 of FIG. 3 are elements that act on signals with frequency dependence. The elements can be tap-and-delay filters. In this example, the gain elements 302, 304, 306, 308 are FIR filters, e.g., feed-forward equalizers (FFEs) 802, 804, 806, 808. An FIR such as an FFE can be used as any or all of the gain elements in any of the electrical MIMO demultiplexers illustrated and/or described herein. Gain elements described herein, including FIRs, can be configured to apply gains of arbitrary magnitude, e.g., including less than 1, equal to 1, or greater than 1.

Based on operation of the frequency-dependent elements, the electrical MIMO demultiplexer having two inputs can combine (e.g., add) a frequency-dependent derivative of a first input with a second input or a derivative thereof. In some implementations, the electrical MIMO demultiplexer can further combine a frequency-dependent derivative of the second input with the first input or a derivative thereof. In some implementations, the electrical MIMO demultiplexer can combine a frequency-dependent derivative of the first input with a frequency-dependent derivative of the second input. In some implementations, the incorporation of frequency-dependence can improve the performance of the electrical MIMO demultiplexer, e.g., improve a performance of the demultiplexer in mitigating impairments from polarization-dependent loss and/or polarization-mode dispersion.

For example, in the case of the electrical MIMO demultiplexer 800, FFEs 802, 804, 806, 808 each transform signals with frequency-dependence. As such, the summers 322, 324 each add a frequency-dependent derivative of X' to a frequency-dependent derivative of Y'.

In some implementations, a portion of the FFEs 802, 804, 806, 808 are replaced by shorts and/or by non-frequency-dependent elements such as the gain elements of FIG. 3. For example, FFEs 804, 806 can be replaced with shorts or non-frequency-dependent gain elements, such that the summer 322 adds a frequency-dependent derivative of Y' to X' or a non-frequency-dependent derivative thereof, and summer 324 adds a frequency-dependent derivative of X' to Y' or a non-frequency-dependent derivative thereof. Any or all of the FFEs 802, 804, 806, 808 can be controllable by the controller 350.

Figure 9:
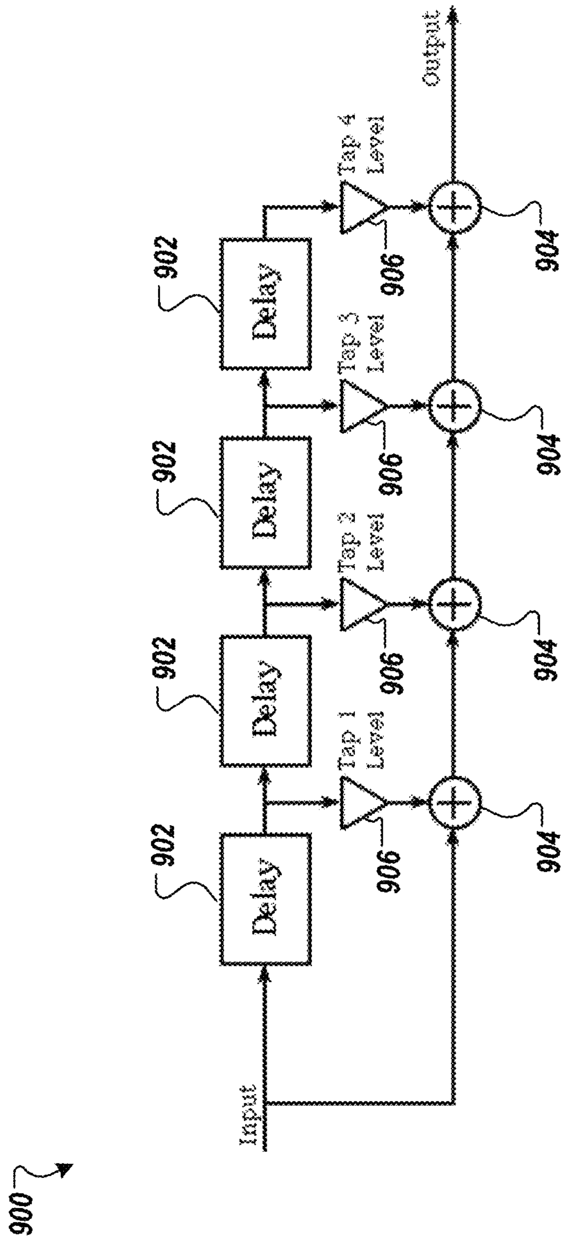
FIG. 9 illustrates an example of a finite impulse response (FIR) filter.

FIG. 9 illustrates an example of a FFE 900 that can be used as any or all of the FFEs 802, 804, 806, 808. The FFE 900 provides an input signal through one or more delay elements 902 (e.g., a digital delay line, delay line, or delay filter) that output their input with a delay. Outputs of the delay elements 902 are tapped by taps 906, the outputs of which are summed serially using summers 904 to produce an output of the FFE 900. Although the FFE 900 is illustrates as having four delay elements 902, taps 906, and summers 904, FFEs within the scope of this disclosure can have arbitrary numbers of these elements, e.g., one, two, three, four, five, six, or more.

In some implementations, an FFE is controlled by adjusting the taps and/or delay elements of the FFE. For example, in a digital FFE, input signals are sampled with samples s[n], where n is an integer and samples are separated in time by the symbol period. In a five-tap FFE, the FFE is configured to generate $s_{out}[n]=t1\cdot s[n-2]+t2\cdot s[n-1]+t3\cdot s[n]+t4\cdot s[n+1]+t5\cdot s[n+2]$. The controller 350 can be configured to control/adjust the values of any or all of t1, t2, t3, t4, and/or t5 based on a feedback signal as described with respect to FIG. 5, e.g., to maximize the signal-to-noise ratios of X" and Y" and/or to optimize one or more other metrics.

In some implementations, the FFE is configured and/or controlled such that the sum of the tn (e.g., t1-t5 in a five-tap FFE) is positive. In some implementations the FFE is arranged on a cross-arm of an electrical MIMO demultiplexer and has a positive sum of the tn. In some implementations, the FFE is arranged on a cross-arm of an electrical MIMO demultiplexer, and the sum of the tn has the same sign as a gain applied on a bar-arm of the demultiplexer.

In some implementations, an electrical MIMO demultiplexer having the frequency-dependence noted above is implemented digitally, e.g., included in a DSP.

Although the electrical MIMO demultiplexer 800 and other electrical MIMO demultiplexers with frequency-dependence are discussed above in the context of homodyne transmitters/receivers in which DP signals have a common carrier frequency, in some implementations such an electrical MIMO demultiplexer is used in a heterodyne system in which light with two different wavelengths is modulated with two different signals. For example, such an electrical MIMO demultiplexer can be used as the electrical demultiplexer in the receivers and systems described in U.S. patent application Ser. No. 18/235,032.

Next, examples of optical MIMO demultiplexers are described with reference to FIGS. 5 and 6. In some implementations, these optical MIMO demultiplexers can be used in conjunction with electrical MIMO demultiplexers. For example, the optical MIMO demultiplexers shown in FIGS. 5 and 6 can be used as the optical MIMO demultiplexers 210, 404, and 424 in FIGS. 2, 4A, and 4B.

FIG. 5 illustrates an example of an optical MIMO demultiplexer 500 that receives two control signals. Demultiplexer 500 includes a polarization splitter and rotator (PBSR) 502, two 50/50 couplers 504 and 506, and two phase shifters 508 and 510 (e.g., differential phase shifters). The two phase shifters 508 and 510 are controlled by separate control signals $\varphi_1$ (512) and $\varphi_2$ (514) provided by a controller 520, the control signals 512, 514 setting respective phase shifts caused by the phase shifters 508, 510. The controller 520 can be the same as the controller 350 that controls the electrical MIMO demultiplexer 300, or can be a separate controller.

In the example of FIG. 5, each of the phase shifters 508 and 510 is a differential phase shifter. For example, phase shifter 508 can be implemented as an interferometer with two individual phase shifting elements (508*a* and 508*b*) that adjust the optical phase in one direction in one arm of the interferometer and adjusts the optical phase in the opposite direction in the other arm. A similar structure is shown for phase shifter 510. Alternatively, in some implementations, each of the phase shifters 508 and 510 can be implemented as a non-differential phase shifter with just one phase shifting element in a single arm. The differential implementations shown in FIG. 5 has several advantages over non-differential implementations. For example, the differential implementation has an advantage of requiring a smaller range per phase shifter. Furthermore, for a thermo-optic phase shifter, a differential phase shifter has half the worst-case power consumption as compared to a single phase shifter, and also has the benefit of constant total power consumption, which mitigates thermal transients. For purposes of this disclosure, a differential phase shifter (e.g., phase shifter 508) is considered as one phase shifter, with the understanding that it is implemented with two phase shifters (e.g., phase shifting elements 508*a* and 508*b*) and one control signal (e.g., $\varphi_1$, 512).

With this structure, the demultiplexer 500 can be represented as a matrix D (using the Mueller notation for polarization) having the following form:

$$D = \begin{bmatrix} j\sin\frac{\phi_2}{2} & j\cos\frac{\phi_2}{2} \\ j\cos\frac{\phi_2}{2} & -j\sin\frac{\phi_2}{2} \end{bmatrix} \begin{bmatrix} e^{\frac{j\phi_1}{2}} & 0 \\ 0 & e^{\frac{-j\phi_1}{2}} \end{bmatrix}$$

However, the configuration of the optical MIMO demultiplexer 500 in FIG. 5 may be limited in that, if the randomly drifting phase caused by the optical fiber requires that the phase control $\varphi_1$ (512) continuously increase, then at some point, due to the input limitations on $\varphi 1$, the phase shift caused by phase shifter 508 must be reduced by $2\pi$ (so-called "reset"). However, during this reset, the reception of signals must be interrupted, resulting in possible loss of data and a potentially significant error burst in high-rate communications. To address this problem, a demultiplexer can implement more than two stages of phase shifters.

For example, FIG. 6 illustrates another example of an optical MIMO demultiplexer 600. The demultiplexer 600 can be implemented as part of a direct detection receiver. In some implementations, demultiplexer 600 is implemented using integrated photonics, which can reduce cost compared to bulk optics.

The demultiplexer 600 includes three stages (602, 604, and 606) of phase shifting. Each stage is controlled by a phase shift control signal from a controller 644. For example, the first stage 602 is controlled by a first control signal 608, the second stage 604 is controlled by a second control signal 610, and the third stage 606 is controlled by a third control signal 612. Each control signal controls the amount of phase shift that is implemented in the respective phase shifting stage.

In the example of FIG. 6, each stage has a phase shifter and a 2×2 coupler that operate on a pair of optical signals (light) in a pair of optical transmission paths. For example, the first stage 602 has a pair of transmission paths 614 and 616, optical phase shifting elements 618 and 620 (together forming a differential phase shifter as discussed with respect to FIG. 5), and a 2×2 coupler 622. Similarly, the second stage 604 has a pair of transmission paths 624 and 626, optical phase shifting elements 628 and 630 (together forming a differential phase shifter), and a 2×2 coupler 632. Finally, the third stage 606 has a pair of transmission paths 634 and 636, optical phase shifting elements 638 and 640 (together forming a differential phase shifter), and a 2×2 coupler 642. The 2×2 couplers in this disclosure can be, for example, implemented by directional couplers, multi-mode interference couplers, or adiabatic couplers, to provide several non-limiting examples.

Although the example of FIG. 6 shows differential implementations of phase shifters, some implementations may use non-differential implementations with just one optical phase shifting element (in one transmission path) in a stage. Throughout this disclosure, the phase difference between the two optical transmission paths (in a stage) is referred to simply as "$\varphi$" (or, equivalently, "$\phi$") regardless of whether the phase shift is implemented by a differential phase shifter (e.g., where each phase shifting element in the differential pair is designed to shift by $+/-\varphi/2$, as shown in the example of FIG. 6) or implemented by a non-differential phase shifter (which shifts the phase of light in just one transmission path by an amount$+/-\varphi$ relative to light in the other transmission path). As such, the term "phase shifter" can apply to a differential phase shifter or to a non-differential phase shifter.

The phase shifters/optical phase-shifting elements can be thermo-optic (thermo-optic phase shifter, TOPS), electro-optic (electro-optic phase shifter, EOPS), or other types. The TOPS may have a slow response time but can be sped-up by covering with metal and/or shortening the distance to a heat sink. The power consumption of the TOPS can be reduced by having the optical transmission path pass through the heated region multiple times. The EOPS can operate based on, for example, current injection, carrier depletion, or the Pockels effect. Each phase shifter can include multiple sections, such as a section with a phase shifter type that has a fast response time but more power consumption and a section with a phase shifter type that has a slow response time but reduced power consumption.

The three stages (602, 604, 606) of demultiplexer 600 are controlled to phase-shift light within specific ranges or with specific values in a coordinated manner, so as to ensure that the demultiplexer 600 can achieve an "endless" property of demultiplexing without requiring a reset of any of the phase shifters. In particular, in the example of FIG. 6, the first control signal 608 for the first stage 602 is digital, with a value that causes a phase-shift $\varphi_1$ of either $-\pi/2$ or $+\pi/2$. The second control signal 610 for the second stage 604 can be analog or digital, operating over a continuous or discrete set of values that results in a continuous or discrete set of phase shifts $\varphi_2$ between $-\pi$ and $+\phi$. The third control signal 612 for the third stage 606 can be analog or digital, operating over a continuous or discrete set of values within a range that depends on the phase shift $\varphi_1$ caused by the first stage 602 based on the first control signal 608. For example, the third control signal 612 can cause a continuous or discrete set of phase shifts $\varphi_3$ between 0 and $+\pi$ when $\varphi_1$ is $-\pi/2$ and between $-\pi$ and 0 when $\varphi_1$ is $+\pi/2$.

During operation of the demultiplexer 600, light that has traveled through a fiber (e.g., fiber link 114) first enters a splitter, such as PBSR 646, which splits the input light into respective light in two optical transmission paths 614 and 616. The PBSR 646 splits the input light into two polarizations and rotates one of the polarizations so that both outputs of the PBSR are in the same polarization. Thus, although path 614 contains light that was in one polarization when it entered the PBSR 646 and path 616 contains light that was in the orthogonal polarization when it entered the PBSR 646, once in paths 614 and 616, the light in both paths 614 and 616 are in the same polarization. Although the example of FIG. 6 shows the splitter implemented by PBSR 646, other types of splitters can be used, including passive photonic integrated devices such as a polarization splitting grating coupler (PSGC).

The split input light enters the two optical transmission paths 614 and 616 of the first stage 602 and undergoes relative phase shifts through phase shifting elements 618 and 620, such that light in one optical transmission path is phase-shifted by an amount $\varphi_1$ relative to light in the other optical transmission path. The amount of this relative phase shift $\varphi_1$ is controlled by the control signal 608. The phase-shifted light in the two optical transmission paths then enter a 2×2 coupler 622 which combines the relative phase-shifted light. This process repeats through the second stage 604 and the third stage 606, undergoing different phase shifts controlled by control signals 610 (causing a phase shift $\varphi_2$) and 612 (causing a phase shift $\varphi_3$).

The controller 644 controls the amount of relative phase shift in the three stages 602, 604, and 606 via the control signals 608, 610, and 612. In scenarios of closed-loop feedback, this control can be based on feedback information 648 which can be, for example, a measurement of an error or other figure of merit in the received signal, e.g., in X' and Y'. For example, the feedback information 648 can include X' and Y' and/or derivatives thereof as discussed with respect to the fed-back information in FIG. 3. For example, the controller 644 can generate the control signals 608, 610, 612 to optimize the figure of merit (e.g., minimize the error) based on the feedback information 648. Although FIG. 6 shows the controller 644 as part of the demultiplexer 600, in some implementations, the controller 644 may be implemented separately. The controller 644 can be integrated together with the controller 350 that controls the electrical MIMO demultiplexer, or can be separate from the controller 350.

An example of a specific algorithm that can be used by the controller 644 for controlling and coordinating the control signals 608, 610, and 612 will be described next. This algorithm can be used to control relative phase shifts in the demultiplexer 600.

First, light is received through a pair of MIMO inputs into a first pair of optical transmission paths 614, 616. A first optical phase shifter (e.g., a differential phase shifter formed by phase shifting elements 618 and 620) is controlled to apply a first relative phase shift between respective light in the first pair of optical transmission paths 614, 616. In some implementations, the first optical phase shifter can be controlled in a binary manner, for example, to apply a phase shift with values (c+π/2) and (c−π/2), where "c" is a real number reflecting an offset. This control can be based on feedback information (e.g., using pilot tones).

Then, light in the first pair of optical transmission paths 614, 616 is combined in a first 2×2 optical coupler 622 to output a second pair of optical signals/light into a second pair of optical transmission paths 624, 626. A second optical phase shifter (e.g., a differential phase shifter formed by phase shifting elements 628 and 630) is controlled to apply a second relative phase shift between light in the second pair of optical transmission paths 624, 626. In some implementations, the second optical phase shifter can be controlled to cause a phase shift within a finite range of values that includes −nπ and +nπ, where "n" is an integer. For example, this control can be performed using an analog second control signal 610 that causes a phase shift within a continuous range of values (−nπ, +nπ). This control can be based on feedback information (e.g., using pilot tones).

Then, the light in the second pair of optical transmission paths 624, 626 is combined in a second 2×2 optical coupler 632 to output a third pair of optical signals/light into a third pair of optical transmission paths 634, 636. A third optical phase shifter (e.g., a differential phase shifter formed by phase shifting elements 638 and 640) is controlled to apply a third relative phase shift between light in the third pair of optical transmission paths 634, 636. In some implementations, the third optical phase shifter can be controlled to cause a phase shift within a finite range that depends on the value of the first relative phase shift. For example, as described above, the third optical phase shifter can be controlled to apply a phase shift between 0 and +nπ if the first relative phase shift is equal to (c−π/2), and to apply a phase shift between −nπ and 0 if the first relative phase shift is equal to (c+π/2), where "n" is an integer. For example, this control can be performed using an analog third control signal 612 that causes a phase shift within the continuous ranges of values (0, +nπ) and (−nπ, 0). This control can be based on feedback information (e.g., using pilot tones).

Then, light in the third pair of optical transmission paths 634, 636 is combined in a third 2×2 optical coupler 642 to output a fourth pair of optical signals/light into a fourth pair of optical transmission paths 850, 852. Light in the fourth pair of optical transmission paths 650, 652 is then output through a pair of MIMO outputs. In some implementations, these outputs (x' and y') can be input to photodetectors and subsequently processed through electrical MIMO demultiplexing, as shown in the examples of FIGS. 2, 4A, and 4B.

Although this algorithm was described as a specific ordering of steps, one or more of these steps can be performed in a different order. For example, the control of the first, second, and third optical phase shifters can be performed in a different order. Moreover, the optical demultiplexer is not limited to two stages or three stages but, rather, can include any suitable number of stages.

Through such phase-shifting algorithms, optical demultiplexer 600 is able to compensate for random birefringence changes which rotate the polarizations of light, e.g., caused by distortions introduced in the optical communication system.

In addition to compensating for phase shifts, in some implementations, a demultiplexer can also be designed to compensate for other non-idealities, such as polarization dependent loss (PDL). In general, PDL may be caused by the fiber line itself, or by other elements of the communication system, such as fiber connectors, isolators, amplifiers, splitters, fiber couplers, or PBSRs. While PDL may be negligible in many short fiber-optic links, as the length of the fiber increases, PDL can have a more substantial impact on proper reception of the optical signals. In scenarios that include polarization dependent loss (PDL), the amount of loss experienced in each of the two polarizations of light may be different, e.g., the loss in the transverse magnetic (TM) mode may be greater/smaller than the loss in transverse electric (TE) mode. This results in a channel matrix F which is non-unitary. In this case, optical demultiplexing with optical phase shift controls alone may be insufficient to fully separate the optical signals which have been mixed in the two polarizations of light. In such scenarios, a subsequent step of electrical MIMO demultiplexing can be used to remove residual crosstalk, as discussed above with reference to FIGS. 4B, 6A, and 6B, and to obtain more-accurate X" and Y".

Figure 7:
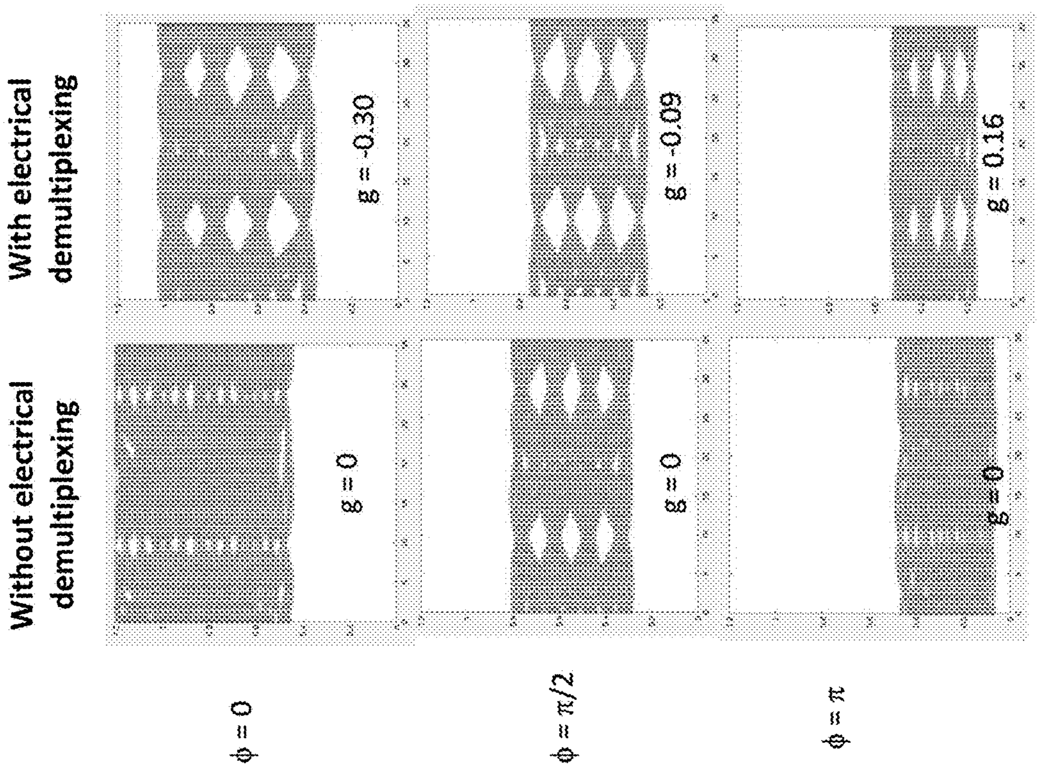
FIG. 7 illustrates examples of simulated demultiplexing.

FIG. 7 shows examples of simulations of homodyne dual-polarization demultiplexing performed using a combination of an optical MIMO demultiplexer and an electrical MIMO demultiplexer. Specifically, FIG. 7 shows simulated eye diagrams of one polarization of simulated dual-polarization Pulse Amplitude Modulation 4-level (DP-PAM-4) signals in the presence of imperfect optical demultiplexing and cross-talk with $\varepsilon_{12}=\varepsilon_{21}=0.3$. The left-side column of eye diagrams shows outputs without electrical demultiplexing, and the right-side column of eye diagrams shows outputs with electrical demultiplexing. The indicated values of g are g12 and g21 in the butterfly network shown in FIG. 3. As shown in FIG. 7, electrical demultiplexing significantly improves performance, changing the "eye" from "closed" to "open," reflecting more-accurate extraction of X and Y as the output signals X' and Y'. As expected, some cross-talk remains after electrical demultiplexing, except for the case of $\phi=+/-\pi/2$, in which case the nonlinear terms drop out of Equations 2 and 3.

The examples of architectures of optical and electrical systems described herein are not exhaustive. For example, extra optical and/or electrical components can be included in the direct detection receivers described herein without departing from the scope of this disclosure, such as optical and/or electrical filters, amplifiers/attenuators, splitters, couplers, etc. Moreover, in some implementations, one or more optical and/or electrical component shown in the described detection receivers can be omitted, without departing from the scope of this disclosure. In addition, unless otherwise indicated, signals and light described as being "from" a component need not be directly from the component but, rather, can have been processed in one or more ways. For example, an output received "from" a demultiplexer need not be the direct output from the demultiplexer but may have been amplified, attenuated, filtered, etc., before being received.

While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results.

What is claimed is:

1. A dual-polarization (DP) intensity-modulated direct detection (IMDD) system, comprising:

a transmitter comprising:

a laser configured to emit light, a first splitter configured to split the light from the laser into a first input light and a second input light, a first modulator configured to modulate the first input light with a first data stream and a second modulator configured to modulate the second input light with a second data stream, and at least one first optical element configured to cause the modulated first input light and modulated second input light to have different polarizations and provide the modulated first input light and modulated second input light into a transmission link; and a receiver comprising:

an input port configured to receive light from the transmission link, at least one second optical element configured to split the light from the transmission link into a first split light provided into a first optical transmission path and a second split light, with a different polarization, provided into a second optical transmission path, an optical 2×2 multi-input-multi-output (MIMO) demultiplexer configured to receive light from the first optical transmission path and the second optical transmission path, a pair of photodetectors comprising (i) a first photodetector configured to detect a first demultiplexed output from the optical 2×2 MIMO demultiplexer and output a first electrical signal into a first electrical transmission path, and (ii) a second photodetector configured to detect a second demultiplexed output from the optical 2×2 MIMO demultiplexer and output a second electrical signal into a second electrical transmission path, and an electrical 2×2 MIMO demultiplexer configured to receive a signal from the first electrical transmission path and a signal from the second electrical transmission path and output a first demultiplexed signal and a second demultiplexed signal.

2. The DP-IMDD system of claim 1, wherein the electrical 2×2 MIMO demultiplexer has a butterfly structure comprising at least one adjustable element on a cross-arm of the butterfly structure.

3. The DP-IMDD system of claim 2, wherein the electrical 2×2 MIMO demultiplexer comprises:

a first splitter configured to split the signal from the first electrical transmission path into a third electrical transmission path and a fourth electrical transmission path;

a second splitter configured to split the signal from the second electrical transmission path into a fifth electrical transmission path and a sixth electrical transmission path;

a first gain element configured to apply a controllable gain on the third electrical transmission path;

a second gain element configured to apply a controllable gain on the fifth electrical transmission path;

a first summing element configured to sum an output of the first gain element and an output from the sixth electrical transmission path; and a second summing element configured to sum an output of the second gain element and an output from the fourth electrical transmission path.

4. The DP-IMDD system of claim 3, comprising at least one of:

a third gain element configured to apply a gain on the fourth electrical transmission path and output to the second summing element; or a fourth gain element configured to apply a gain on the sixth electrical transmission path and output to the first summing element.

5. The DP-IMDD system of claim 2, comprising a controller configured to control the at least one adjustable element to apply a gain of the same sign as a gain applied on a bar-arm of the butterfly structure.

6. The DP-IMDD system of claim 2, comprising a controller configured to control the at least one adjustable elements to apply a gain having a magnitude that is substantially equal to $$\frac{-\varepsilon_{12}^2 - \varepsilon_{12}\cos\varphi_{12}\sqrt{\frac{c_1}{c_2}}}{1 + \varepsilon_{12}\cos\varphi_{12}\sqrt{\frac{c_2}{c_1}}}$$

where $\varepsilon_{12}$ is a degree of cross-talk between the first demultiplexed signal and the second demultiplexed signal, $c_1$ and $c_2$ are direct current (DC) values of powers associated with the first demultiplexed signal and the second demultiplexed signal, respectively, and $\varphi_{12}$ is a phase between the first demultiplexed signal and a cross-talk signal component.

7. The DP-IMDD system of claim 1, wherein the electrical 2×2 MIMO demultiplexer is a linear electrical network.

8. The DP-IMDD system of claim 1, wherein the electrical 2×2 MIMO demultiplexer comprises an analog electronic circuit.

9. The DP-IMDD system of claim 8, comprising a transimpedance amplifier comprising the electrical 2×2 MIMO demultiplexer.

10. The DP-IMDD system of claim 1, wherein the electrical 2×2 MIMO demultiplexer comprises a digital electronic circuit.

11. The DP-IMDD system of claim 10, comprising a digital signal processor (DSP) comprising the electrical 2×2 MIMO demultiplexer.

12. The DP-IMDD system of claim 10, further comprising:

a first analog-to-digital converter (ADC) configured in the first electrical transmission path between the first photodetector and the electrical 2×2 MIMO demultiplexer; and a second ADC configured in the second electrical transmission path between the second photodetector and the electrical 2×2 MIMO demultiplexer.

13. The DP-IMDD system of claim 1, further comprising:

a first transimpedance amplifier (TIA) configured in the first electrical transmission path between the first photodetector and the electrical 2×2 MIMO demultiplexer; and a second TIA configured in the second electrical transmission path between the second photodetector and the electrical 2×2 MIMO demultiplexer.

14. The DP-IMDD system of claim 1, wherein a pair of optical signals that are output from the optical 2×2 MIMO demultiplexer comprises the first demultiplexed output from the optical 2×2 MIMO demultiplexer and the second demultiplexed output from the optical 2×2 MIMO demultiplexer that are received by the first photodetector and the second photodetector, respectively.

15. The DP-IMDD system of claim 14, wherein the optical 2×2 MIMO demultiplexer provides partial or full demultiplexing for one or both of the pair of optical signals that are output from the optical 2×2 MIMO demultiplexer.

16. The DP-IMDD system of claim 1, wherein the optical 2×2 MIMO demultiplexer comprises:

a first optical phase shifter configured to receive the first split light and the second split light from the at least one optical element and apply a first relative phase shift between the first split light and the second split light;

a first 2×2 optical coupler configured to combine the first split light and the second split light and output third light and fourth light;

a second optical phase shifter configured to apply a second relative phase shift between the third light and the fourth light; and a second 2×2 optical coupler configured to combine the third light and the fourth light and output fifth light and sixth light.

17. The DP-IMDD system of claim 1, wherein the electrical 2×2 MIMO demultiplexer is configured to combine (i) a controllable frequency-dependent derivative of the signal from the first electrical transmission path with (ii) the signal from the second electrical transmission path or a derivative thereof.

18. A method of performing dual-polarization (DP) intensity-modulated direct detection (IMDD) transmission, comprising:

generating light using a laser;

splitting the light from the laser into first input light and second input light;

modulating the first input light with a first data stream and modulating the second input light with a second data stream;

causing the modulated first input light and the modulated second input light to have different polarizations and providing the modulated first input light and the modulated second input light into a transmission link;

receiving light from the transmission link;

splitting the light from the transmission link into first split light provided into a first optical transmission path and second split light provided into a second optical transmission path;

performing optical 2×2 multi-input-multi-output (MIMO) polarization demultiplexing on light from the first optical transmission path and the second optical transmission path;

detecting a first output from the optical 2×2 MIMO polarization demultiplexing with a first photodetector and outputting an electrical signal into a first electrical transmission path, and detecting a second output from the optical 2×2 MIMO polarization demultiplexing with a second photodetector and outputting an electrical signal into a second electrical transmission path; and performing electrical 2×2 MIMO polarization demultiplexing on a signal from the first electrical transmission path and a signal from the second electrical transmission path, to output a first demultiplexed signal and a second demultiplexed signal.

19. The method of claim 18, wherein performing the electrical 2×2 MIMO polarization demultiplexing comprises applying at least one controllable gain on the signals from the first electrical transmission path and the second electrical transmission path using a butterfly network.

20. The method of claim 18, wherein applying the at least one controllable gain comprises applying a first gain in a bar-path of the butterfly network and a second gain in a cross-path of the butterfly network, the first gain and the second gain having the same sign.

* * * * *